(12) United States Patent
Fifield et al.

(10) Patent No.: US 10,614,421 B2
(45) Date of Patent: Apr. 7, 2020

(54) METHOD AND SYSTEM FOR IN-MEMORY POLICY ANALYTICS

(71) Applicant: Oracle International Corporation, Redwood Shores, CA (US)

(72) Inventors: Davin James Fifield, Ainslie (AU); Fiona Carolyn Guy, Ainslie (AU); Andrew Barry, Aranda (AU); Benjamin Stephen O'keeffe, Calwell (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1167 days.

(21) Appl. No.: 14/492,751

(22) Filed: Sep. 22, 2014

(65) Prior Publication Data

US 2015/0088773 A1     Mar. 26, 2015

Related U.S. Application Data

(60) Provisional application No. 61/880,925, filed on Sep. 21, 2013.

(51) Int. Cl.
  *G06Q 10/10* (2012.01)
(52) U.S. Cl.
  CPC .................... *G06Q 10/105* (2013.01)
(58) Field of Classification Search
  CPC .................................................. G06Q 10/10
  See application file for complete search history.

(56) References Cited

U.S. PATENT DOCUMENTS

| | | | |
|---|---|---|---|
| 8,544,058 B2 | 9/2013 | Lim | |
| 8,875,218 B2 | 10/2014 | Lim | |
| 9,531,595 B2 | 12/2016 | Lim | |
| 9,740,703 B2 | 8/2017 | Lim | |
| 9,864,752 B2 | 1/2018 | Lim | |
| 2003/0097383 A1* | 5/2003 | Smirnov | G06Q 10/10 |
| 2007/0083407 A1* | 4/2007 | Allen | G06Q 20/108 705/70 |
| 2009/0119746 A1* | 5/2009 | Allen | G06Q 10/10 726/1 |
| 2009/0281977 A1* | 11/2009 | Allen | G06F 21/577 706/47 |
| 2010/0049558 A1* | 2/2010 | Beigi | G06Q 10/10 705/35 |
| 2011/0029947 A1* | 2/2011 | Markovic | G06Q 10/10 717/102 |
| 2013/0219022 A1* | 8/2013 | Manivel | G06F 9/5011 709/219 |
| 2015/0269383 A1* | 9/2015 | Lang | G06F 21/57 726/1 |

* cited by examiner

*Primary Examiner* — Kurtis Gills
(74) *Attorney, Agent, or Firm* — Sheppard Mullin Richter & Hampton LLP

(57) ABSTRACT

A method, system, and computer-program product for in-memory policy analytics are disclosed. The method includes creating a policy model and determining an effect of a change to one of a value of one of one or more parameters. The policy model is configured to represent one or more policy scenarios by virtue of comprising one or more parameters, and each of the one or more scenarios is defined, at least in part, by each of the one or more parameters comprising a value or a plurality of values. Further, the effect is on at least one of the one or more scenarios.

15 Claims, 26 Drawing Sheets

User Interface Screen 1600 the weekly rate of Carer's Allowance payable

Sentences
What is the weekly rate of Carer's Allowance payable?
the weekly rate of Carer's Allowance payable is %@%.
the weekly rate of Carer's Allowance payable is uncertain
the weekly rate of Carer's Allowance payable is unknown Entity  Global (auto)  Change Analysis Mapping
○ Input
● Output
○ Parameter

Value
Currency
Input validation

Amount_Payable

Name

*Fig. 16*

User Interface Screen 1800

All Workspaces

| Workspace | Scenario Name | Project | Last Run |
|---|---|---|---|
| Carers Allowance | Variation 1 | UK Carers Data | Sep 9, 2014 10:16:52 PM |
| | Current Rules | UK Carers Data | Sep 9, 2014 10:16:46 PM |
| Higher Education | 2013 Thresholds | Higher Ed Analysis | Sep 10, 2014 11:15:29 PM |
| | 2014 Thresholds | Higher Ed Analysis | Sep 11, 2014 10:45:43 PM |

Add a new workspace

*Fig. 18*

User Interface Screen 1900

Fig. 20

Create Scenario

| | | | Hours* | Weekly Benefit Cap* | Actions |
|---|---|---|---|---|---|
| Workspace: | Carers Allowance | | week | 500.0 | Edit Copy Delete |
| Name: | New Scenario | | week | 500.0 | Edit Copy Delete |
| Project: | UK Carers Data | | | | |
| Date | 2014-09-08 | | | | |
| Maximum Income | 2,600 and less than | | | | |
| Minimum Age | 16 - 24 | | | | |
| Minimum Care Hours | 35-49 hours per wee | | | | |
| Weekly Benefit Cap | | | | | |

0-9 hours
10-19 hours
20-34 hours
35-49 hours per week
50-99 hours per week
100 or more hours per week
Varies - Under 20 hours
Varies - 20 hours or more
Other
Not stated The household member might be eligible for age benefits.

User Interface Screen 2000

User Interface Screen 2100

Carers Allowance

| Scenario | 'Date' | 'Maximum Income' | 'Minimum Age' | 'Minimum Care Hours' | 'Weekly Benefit Cap' | Actions |
|---|---|---|---|---|---|---|
| Variation 1 *Project: UK Carers Data* | 2014-09-08 | 2,000 and less than 5,200 | 25 - 44 | 35-49 hours per week | 500.0 | Edit Copy Delete |
| Current Rules *Project: UK Carers Data* | 2014-09-09 | 2,000 and less than 5,200 | 16 - 24 | 35-49 hours per week | 500.0 | Edit Copy Delete |
| Test Scenario *Project: UK Carers Data* | 2014-09-10 | 15,600 and less than 20,800 | 25 - 34 | 35-49 hours per week | 1500.0 | Edit Copy Delete |

Add a new scenario
Return to the summary page

*Fig. 21*

User Interface Screen 2200

METHOD AND SYSTEM FOR IN-MEMORY POLICY ANALYTICS

CROSS-REFERENCE TO RELATED APPLICATIONS

The present patent application claims priority to Provisional Patent Application Ser. No. 61/880,925, filed Sep. 21, 2013, and entitled "Method and System for In-Memory Policy Analytics," which is hereby incorporated by reference herein, in its entirety and for all purposes.

FIELD OF THE INVENTION

The present invention relates to policy implementation, and, more particularly, to a method and system for in-memory policy analytics.

BACKGROUND OF THE INVENTION

As digital sources of information have become increasingly important in the business, academic and personal computing arenas, improved mechanisms for quickly and efficiently implementing new functionality in the applications that manage and present such information have also become increasingly important.

SUMMARY OF THE INVENTION

In one embodiment, a method, system, and computer-program product for in-memory policy analytics are disclosed. The method includes creating a policy model and determining an effect of a change to one of a value of one of one or more parameters. The policy model is configured to represent one or more policy scenarios by virtue of comprising one or more parameters, and each of the one or more scenarios is defined, at least in part, by each of the one or more parameters comprising a value or a plurality of values. Further, the effect is on at least one of the one or more scenarios.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from concepts such as those disclosed herein and their broader aspects. Other aspects, inventive features, and advantages of systems according to the concepts disclosed herein will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 16 is a simplified block diagram illustrating an example of a user interface screen, according to embodiments of the methods and systems disclosed herein.

FIG. 18 is a simplified block diagram illustrating an example of a user interface screen, according to embodiments of the methods and systems disclosed herein.

FIG. 20 is a simplified block diagram illustrating an example of a user interface screen, according to embodiments of the methods and systems disclosed herein.

FIG. 21 is a simplified block diagram illustrating an example of a user interface screen, according to embodiments of the methods and systems disclosed herein.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the systems described herein and equivalents thereof, as defined solely by the claims, will become apparent in view of the examples described in the detailed description set forth below.

DETAILED DESCRIPTION

Introduction

Systems such as those described herein provide methods and systems for in-memory policy analytics. In-memory policy analytics provides a method for analysts to create policy scenarios and analyze the outcomes when applied to a known data set. The functions of policy automation are combined with the analysis functions using a server in a policy analytics architecture to provide analysis outcomes over large amounts of data, effectively in a real-time manner. A policy analytics architecture according to embodiments of the methods and systems disclosed herein supports What-If analysis, policy visualization, test coverage reporting data warehouse enrichment, and other such salutary features.

Generally, the components of an in-memory policy analytics architecture, according to embodiments of the methods and systems disclosed herein, include:

- A policy modeling (PM) application, which provides policy authors with the ability to create policy models, including analysis mark-ups.
- A policy automation hub, which provides features such as a repository for policy models authored through PM and a user interface for managing the repository.
- One or more input databases (DBs), storing data to be used to construct cases to be included in the analysis process.
- One or more analysis databases, storing data structures used to manage the analysis process and record outcomes.
- An analysis server, which provides for control over the creation and execution of policy scenarios from published policy models, as well as functionality that supports the graphical analysis of outcomes of the policy scenarios.

A policy analysis architecture according to embodiments of the methods and systems disclosed herein is thus designed for modeling complex policies in natural language and other formats to match statutes, regulations and policy manuals, ensuring outcomes are both situation-centric and accurate.

Example Architectures and Processes

Figure 1:
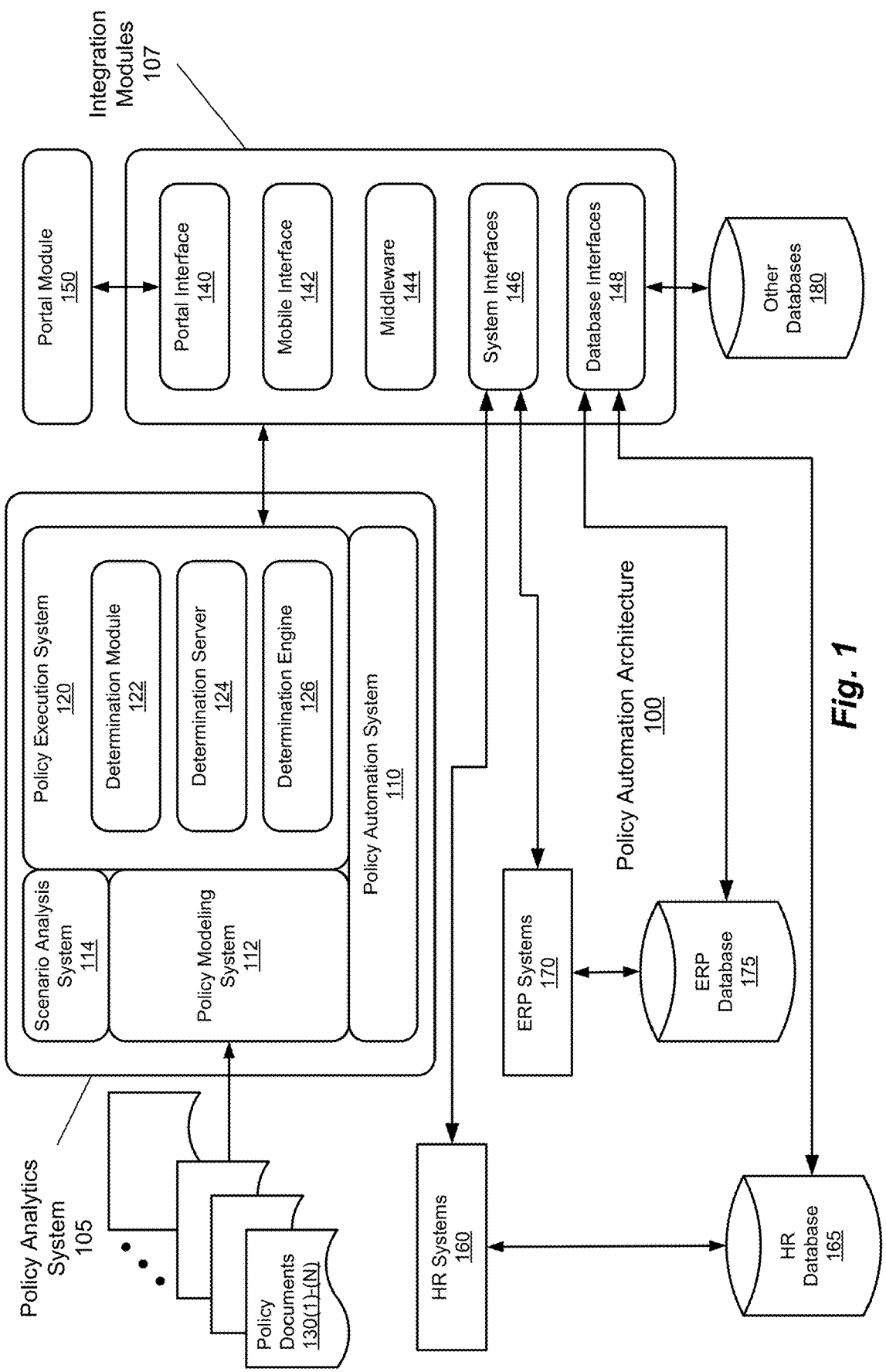
FIG. 1 is a simplified block diagram illustrating an example of a policy automation architecture, according to embodiments of the methods and systems disclosed herein.

FIG. 1 is a simplified block diagram illustrating an example of a policy automation architecture, according to embodiments of the methods and systems disclosed herein. To that end, FIG. 1 illustrates a policy automation architecture 100. Policy automation architecture 100 includes a policy analytics system 105 and integration modules 107. Policy analytics system 105, in turn, includes a policy automation system 110, a policy modeling system 112, and a scenario analysis system 114. Policy automation system 110 also includes a policy execution system 120. Policy execution system 120, in turn, includes a determination module 122, a determination server 124, and a determination engine 126.

The various sub-systems of policy analytics system 105 are in communication with one another, in order to provide intake, processing, and output related to the analysis of policy documents (depicted in FIG. 1 as policy documents 130(1)-(N)). Integration modules 107 provide access to and from policy analytics system 105, and provide such functionality by way of a number of modules, including a portal interface 140, a mobile interface 142, middleware 144, system interfaces 146, and database interfaces 148. Portal interface 140, mobile interface 142, system interfaces 146, and database interfaces 148 provide communication and access functionality with and to policy analytics system 105. Middleware 144 provides the basis by which these modules and policy analytics system 105 are able to communicate with one another. Portal interface 140 provides an interface to a portal module 150, and so provides external access to the functionality of policy analytics system 105 and other elements of policy automation architecture 100 to clients and other such constructs, such as web clients and the like (as mentioned below). In similar fashion, mobile interface 142 provides access to the various elements of policy automation architecture 100 to mobile devices such as tablets, laptop computers, smart phones. For example, mobile (as well as other) devices are able to access the functionality of policy analytics system 105 via portal interface 140 and mobile interface 142, where such mobile devices include, for example, a general packet radio service (GPRS) clients (e.g., a "smart phone," a "tablet" computer, or other such mobile device), web clients (e.g., laptop computers), basic cellular telephones (e.g., using standard texting or other communication protocols), and other such digital devices. Support for GPRS clients, SMS clients, and the like thereby provide users with communication functionality according to an embodiment in a mobile environment.

System interfaces 146 allow devices accessing policy analytic system 105 via integration modules 107, as well as policy analytics system 105 itself, access to enterprise and other systems, as shown by the examples in FIG. 1, such as human resources (HR) systems 160 (and their associated databases (e.g., an HR database 165)), enterprise resource planning (ERP) systems 170 (and their associated databases, such as an ERP database 175). In comparable fashion, database interfaces 148 allow the systems of policy automation architecture 100 (e.g., policy analytics system 105 and its subsystems) access to the aforementioned databases (depicted in FIG. 1 as the communicative coupling of HR database 165 and ERP database 175 to policy analytics systems 105 via database interfaces 148 of integration modules 107). Database interfaces 148 also provide access to other databases (depicted in FIG. 1 as other databases 180), which can include databases for use by policy analytics system 105 as input, storage, temporary storage, and the like, as well as databases of systems not otherwise depicted in FIG. 1.

Figure 2:
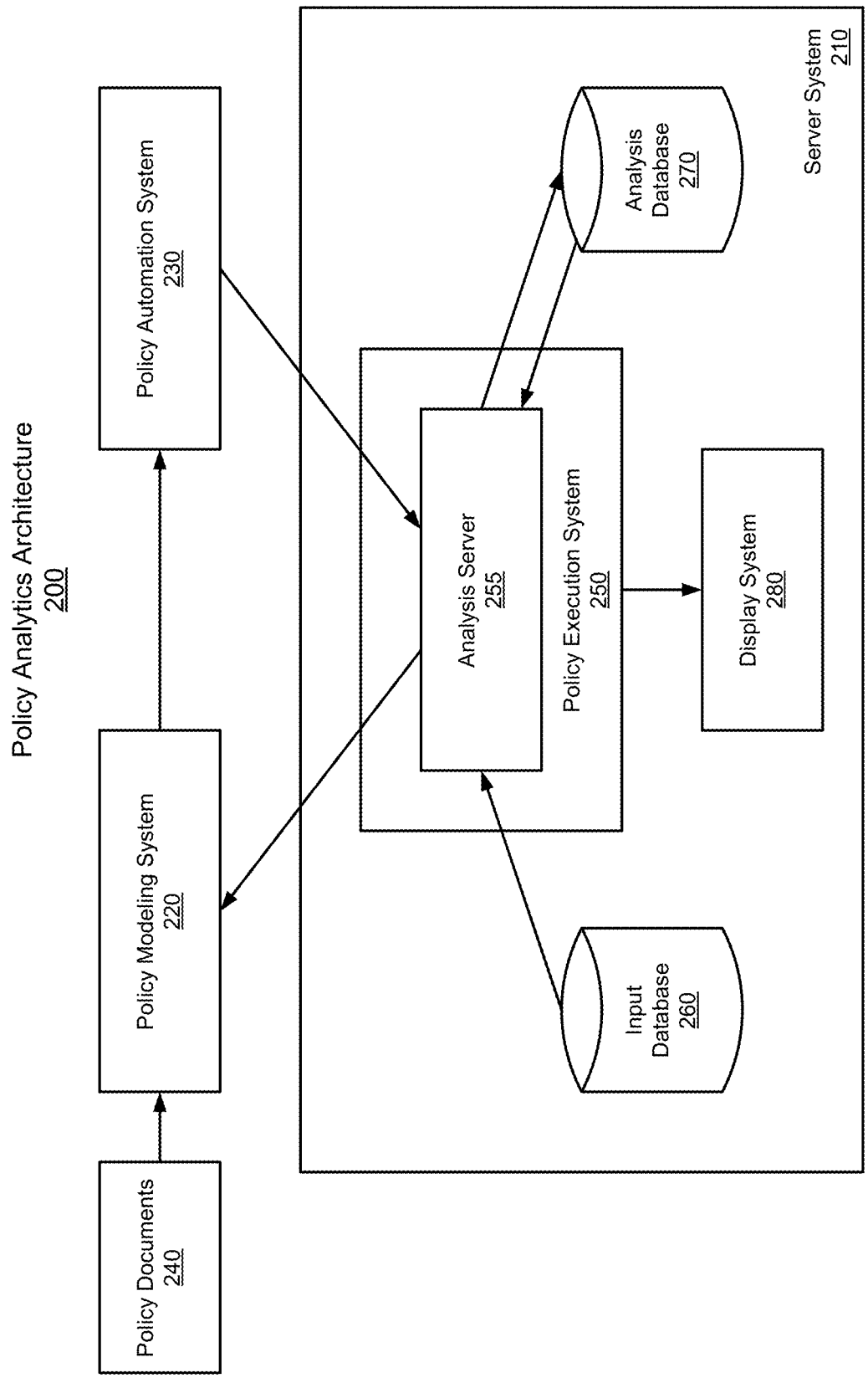
FIG. 2 is a simplified block diagram illustrating an example of a policy analytics architecture, according to embodiments of the methods and systems disclosed herein.

FIG. 2 is a simplified block diagram illustrating an example of a policy analytics architecture, according to embodiments of the methods and systems disclosed herein. FIG. 2 illustrates the basic components of a policy analytics architecture 200, and follows, generally, the architectural features of policy automation architecture 100. Policy analytics architecture 100 thus includes a server system 210, a policy modeling system 220, and a policy automation system 230. In a manner of operation comparable to that of policy automation architecture 100, policy analytics architecture 200 takes in policy documents 240, processes policy documents 240 into a policy model, and then runs one or more scenarios against that policy model (using, e.g., data from one or more sources), to provide a number of outcome for an analyst's consideration. To this end, server system 210 includes a policy execution system 250, which, in turn, includes an analysis server 255. Policy execution system 250 is also coupled to one or more input databases (depicted in FIG. 2 as, for example, an input database 260), one or more analysis databases (depicted in FIG. 2, for example, an analysis database 270), and a display system 280. As will be appreciated in light of the present disclosure, input database 260 can be a standalone data source, one or more existing data sources (e.g., one or more of HR database 165, ERP database 175, and/or other such databases), or a combination thereof. Further, in certain embodiments, input database 260 can be implemented as a memory-optimized in-memory relational database, which stores data in memory-optimized data structures and supports query techniques specifically designed for in-memory processing. By leveraging such capabilities, policy automation architecture 100 provides real-time or near-real time performance. Further, hybrid columnar compression ensures as much business data as possible is available in-memory, and that the data is retrieved quickly, while the built-in on-line analytical processing operators allow policy experts to quickly pivot through the data across policy scenarios, comparing the impact on citizens and customers across geography, time or any other dimension.

Policy modeling system 220 provides policy authors with, among other facilities, the ability to create policy models, including one or more analysis mark-ups. Policy automation system 230 provides a repository for policy models authored using policy modeling system 220, as well as a user interface for managing the repositories maintained thereby. With regard to the support for such functionality provided by the various components of server system 210, input database 260 maintains data that can be used to analyze cases (scenarios) to be included in the analysis process. Also included in server system 210 is analysis database 270, which contains the data structures used to manage the analysis process and report outcomes therefrom. Central to the operation of server system 210 (and thus, policy analytics architecture 200) is analysis server 255, which provides the ability to create and run policy scenarios from published policy models and graphically analyze the outcomes of those policy scenarios. Further, document templates can be added to a project file and automatically included with the compiled rulebase. As will be appreciated in light of the present disclosure, a rulebase can contain one or many documents, which can be in any of a number of formats (textual, graphical, and/or otherwise).

In operation, policy documents 240 service inputs to policy modeling system 220, which generate executable rules from the information included in policy documents 240. Policy modeling system 220 passes these executable rules to the policy automation system 230 for storage and management. Policy automation system 230, in turn, provide these executable rules as a policy model (also referred to herein as a rulebase) to analysis server 255. Analysis server 255 uses policy models provided by policy automation system 230, in conjunction with data from input database 260, to analyze such data for outcomes based on the policy model. Information regarding these outcomes is then stored in analysis database 270. Once one or more such scenarios are processed, such outcomes are presented to a user as guidance upon which to base decisions, as well as for further analysis. This is achieved by policy execution system 250 presenting these outcomes via display system 280. At this juncture, a user can change one or more of the many facets of such scenarios by altering the original policy document (one or more of policy documents 240), one or more of the parameters serving as control functions over the policy model, make changes to the policy model itself, or alter the processing of such scenarios in other ways. This feedback can be accomplished via interfaces to analysis database 270, input database 260, changes to policy documents 240, policy modeling system 220, and/or policy automation system 230. In providing this ability to greatly vary the manner in which the data from input database 260 is analyzed, policy analytics architecture 200 provides for fast and easy analysis and comparison of widely-varying scenarios.

As noted elsewhere herein, a policy analytics architecture such as that described herein employs high-performance computing resources to maximize throughput, and enable the provision of analysis results in real-time or near real-time. To this end, server system 210 can be implemented in a design that is built for in-memory analytics. Thus, a server system such as server system 210 can be designed to store multiple terabytes of data directly in-memory, thereby providing for fast analysis and calculations, resulting in responsive analytic performance and visual analysis. In one embodiment, such a server system supports high-speed main memory of 1 Terabyte (or more, depending on the need of the policy analysis at hand) and 2.4 TB of high-speed second-tier memory (e.g., FLASH memory or the like) that can support hundreds of thousands of input/output operations per second, as well as bandwidth at the multi-gigabytes level. These memory layers are further backed by of hard disk storage (3.6 TBs or more), which is expandable (e.g., using Fibre Channel and other such high-speed technologies). Computationally, server system 210 can include a processing package of 40 compute cores with hyper-threading to provide 80 threads of computation. A general example of such components is provided in connection with the discussion of FIGS. 23 and 24, below.

Figure 3:
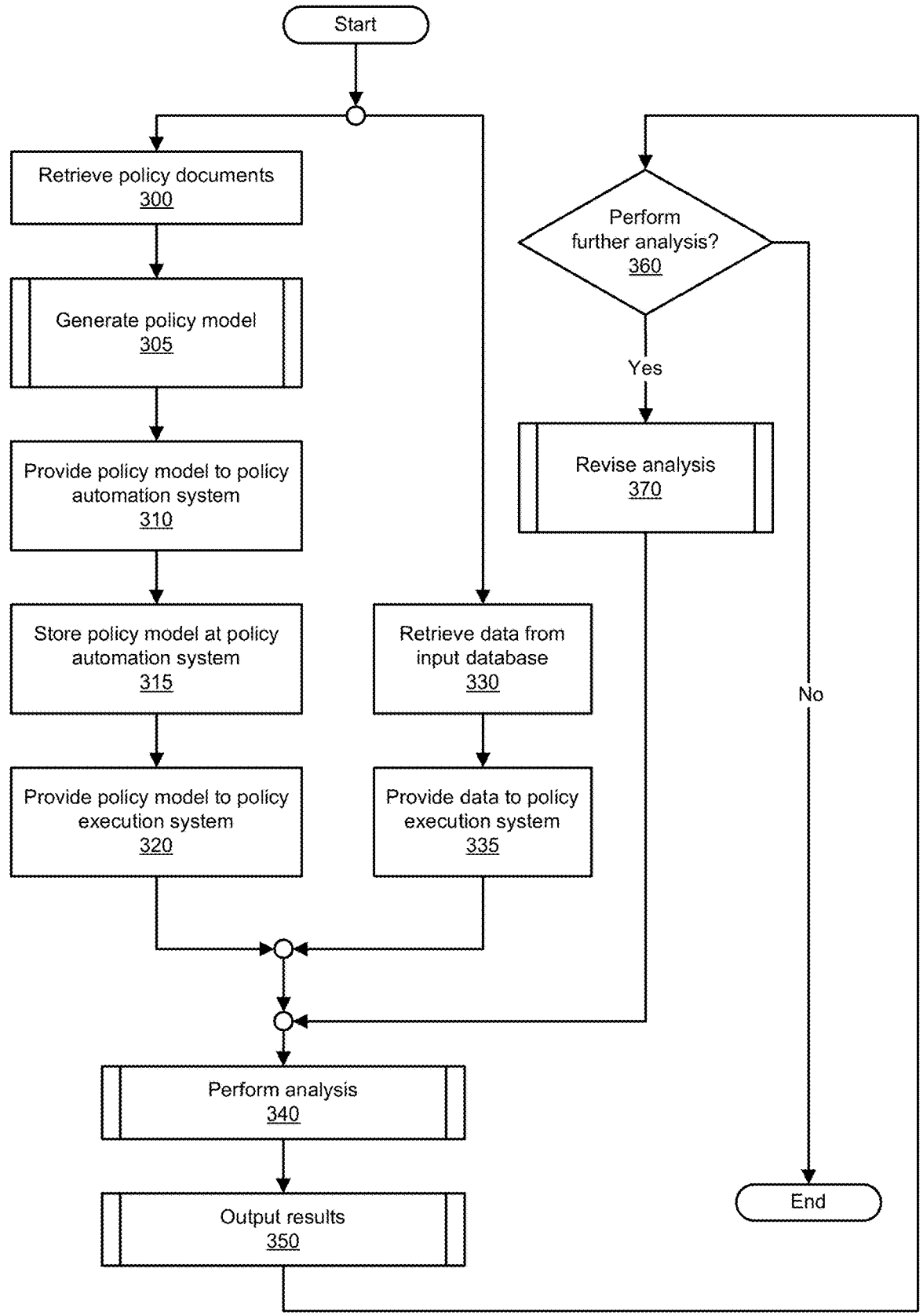
FIG. 3 is a simplified flow diagram illustrating an example of a process for a policy analysis, according to embodiments of the methods and systems disclosed herein.

FIG. 3 is a simplified flow diagram illustrating an example of a process for a policy analysis, according to embodiments of the methods and systems disclosed herein. The process of FIG. 3 begins with the retrieval of the information that will serve as, at least in a first iteration, input to the policy analysis process. That being the case, the process begins with retrieving one or more policy documents (step 300). Next, a process of generating one or more policy models is performed (step 305). Operations performed in the generation of a policy model are discussed in greater detail in connection with FIGS. 4, 5A, and 5B.

Next, the policy model(s) are provided to the policy automation system (step 310). Upon receipt of the policy model, the policy automation system stores the policy model, maintaining information as to the management thereof (step 315). Having stored the policy model, the policy automation system is now able to provide the policy model to the policy execution system (step 320). Also during this process, data is retrieved from the input database (step 330). Data from the input database is then provided to the policy execution system (step 335). As will be appreciated in light of the present disclosure, and as illustrated at FIG. 3, the process of retrieving policy documents, generating a policy model, and providing that policy model to the policy execution system, is performed contemporaneously with the retrieval and provision to the execution system of the data from the input database.

Next, the data is analyzed in view of the policy model thus provided (step 340). Operations performed in performing an analysis of a policy model are discussed in greater detail in connection with FIG. 6. The results of the analysis thus obtained, such outcome results are presented to the user (step 350). Operations performed in presenting the results of an analysis of a policy model are discussed in greater detail in connection with FIG. 7. At this juncture, a determination is made as to whether further analysis should be performed (e.g., in the case of multiple iterations to allow for comparison of various scenarios in, for example, a sequential fashion (scenarios being, for example, each iteration of analysis (revisions to some aspect of the policy analysis and running the revised policy analysis)) (step 360). If further analyses are to be performed, the analysis is revised by altering various aspects of the analysis (e.g., by changing policy documents, policy model parameters, the policy model itself, and/or the like) (step 370). Operations performed in revising an analysis of a policy model are discussed in greater detail in connection with FIGS. 8 and 9. Alternatively (or at the end of some number of iterations), the process concludes. It will be appreciated in light of the present disclosure that the operations, with respect to revising the policy analysis performed, are depicted as being performed in an iterative fashion, cycling through revisions, analysis, and presentment of results. Such operations, in part, take advantage or the near-real-time capabilities of the methods and systems of the present disclosure, allowing a user to make revisions to a policy analysis, and review the results thereof quickly, on the order of less than approximately five minutes (preferably within one minute or less, more preferably within 10 seconds or less, and most preferably one second or less). Alternatively, as will be described subsequently with respect to FIGS. 10 and 11, such policy analysis can be performed using scenarios (packaged iterations defined prior to (or during) policy analysis, thereby allowing the generation and comparison of various outcomes based on these scenarios.

Figure 4:
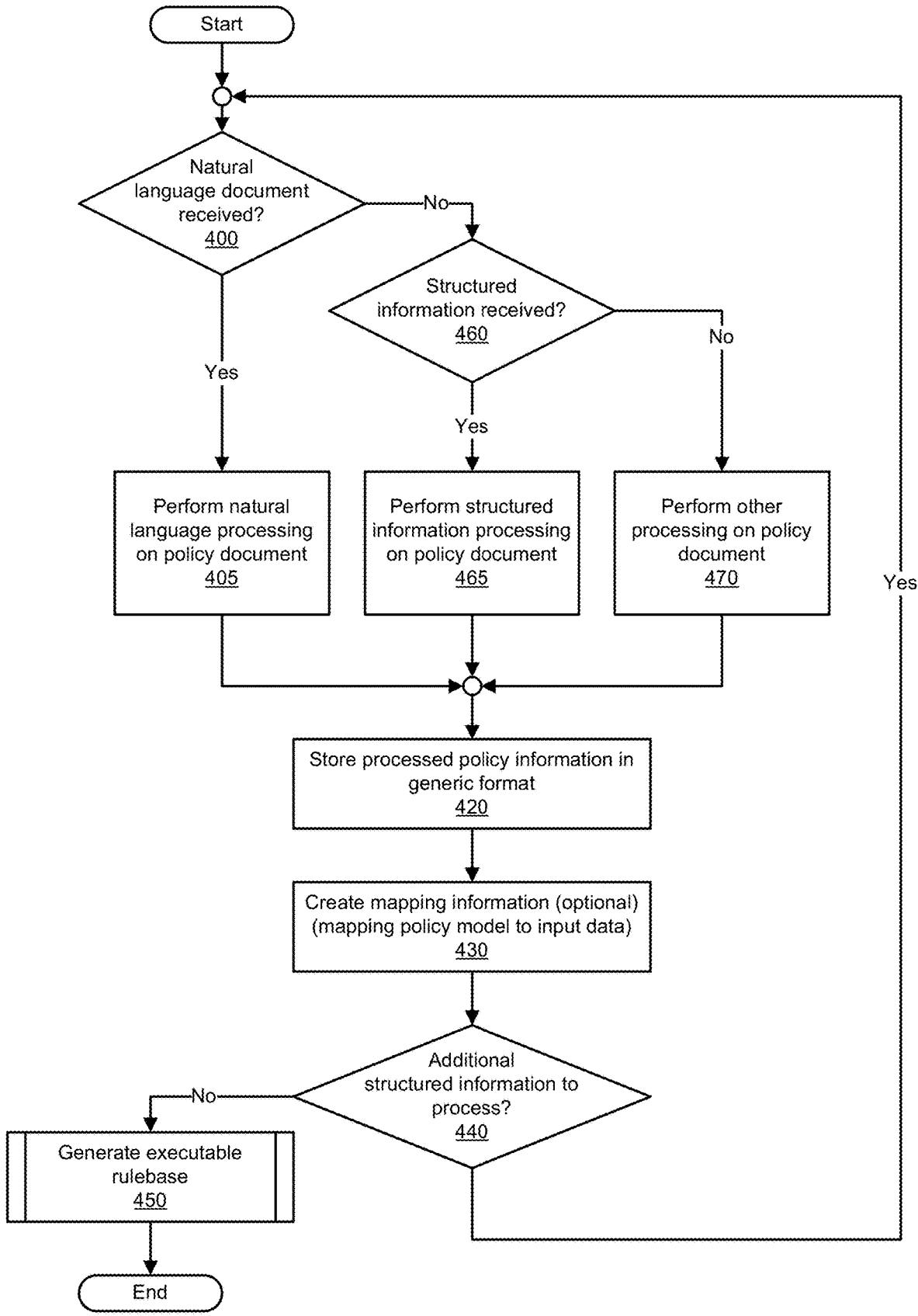
FIG. 4 is a simplified flow diagram illustrating an example of a process for generating a policy model, according to embodiments of the methods and systems disclosed herein.

FIG. 4 is a simplified flow diagram illustrating an example of a process for generating a policy model, according to embodiments of the methods and systems disclosed herein. FIG. 4 is an example of a process for generating a policy model, which includes executable rules, from policy documents, in order to capture the rules, requirements, and other strictures extant within the policies, legislation, and other mandates of such policy documents. This process of policy model generation begins with, in the example depicted in FIG. 4, a determination as to whether the policy document received in a natural language format (e.g., MICROSOFT WORD, a portable format (e.g., Portable Document Format (PDF)), text, or other such format) (step 400). If such is the case, natural language processing is performed on the policy document, in order to extract the aforementioned policies for conversion to executable rules (step 405). Such functionality can include the use of one or more syntactic parsers, including, for example, RLS (restriction language syntax) syntactic parsers and the like.

At this juncture, the processed policy information is stored in a generic format such that the conversion of multiple such policy documents (regardless of format) can be stored in similar fashion, for further processing (step 420). Next, if necessary, a mapping is created between the policy model's data model and the schema of the input data (e.g., data from input database 260) (step 430). In this regard, coverage analysis can be performed using the mapping information, and based on the mapping of rules to data, determinations made as to the need for revisions. Thus, fields in data from a data source (e.g., an input database) are made available to the policy model, facilitating a determination as to which data items available and where rules may need to be adjusted to align to the available data. Using such features, determinations can be made as to the manner in which data maps to specific legislative provisions, allowing for rich and detailed policy analysis. Policy parameters can be identified/selected for inclusion by policy experts, which can then be configured in the policy analysis workspace.

A determination is then made as to whether additional structured information (e.g., policy documents) remain to be processed (step 440). If no further policy documents are to be processed, the policy model (executable rulebase) is generated (step 450). Examples of operations performed in the generation of a policy model are discussed in greater detail in connection with FIGS. 5A and 5B.

In the case in which the policy document received is not in a natural language format (step 400), a determination is made as to whether the policy document received is in a structured format (step 460). If the policy document is in a structured format (e.g., a spreadsheet format, a database format, or other such structured format), processing is performed on the structured information of the policy document, in order to extract the information to be converted into (or used to generate) the corresponding portion(s) of the resulting policy model (step 465). As before, once the structured information has been processed, the processed policy information is stored (step 420) and mapping information is created (optionally; step 430). In one embodiment, such mapping information reflects the mapping policy model to input data. As will be appreciated in light of the present disclosure, while the process of policy model generation depicted in FIG. 4 depicts such mapping as being performed for each iteration (and so each document thus processed (and executable rule set generated)), the creation of such mapping information can be delayed until the relevant documents have been processed (or, in fact, avoided entirely (e.g., where such mapping information is generated/provided separately from the processes depicted herein). At this juncture, the aforementioned determination as to whether further policy documents remain to be processed is made (step 440). If no further policy documents remain to be processed, the policy model (executable rulebase) is generated (step 450).

If the policy document in question is other than a natural language document (step 400) or a structured document (step 460), other processing is performed as necessary on the information in the policy document received (step 470). Such can be the case, for example, in the case of a policy document in some manner of graphical format (e.g., created using a paint program, an object-based program (e.g., VISIO), or other graphics-based software). Once such processing has been completed, the process of generating a policy model proceeds to storing the processed policy information in some manner of generic format, as before (step 420). Optionally, a mapping that maps the data model of the policy model to the input data can be created (step 430). At this juncture, a determination is once again made as to whether additional policy documents remain to be processed (step 440). As before, in the case in which no further policy documents remain to be processed, the policy model is generated (step 450). As with the aforementioned cases, as well as the present case, if further policy documents remain to be processed (step 440), the process returns to the beginning of the aforementioned determinations, and the process repeats for this next policy document (thus, returning to step 400). Once the requisite policy model (s) have been generated (step 450), the process concludes.

Figure 5A:
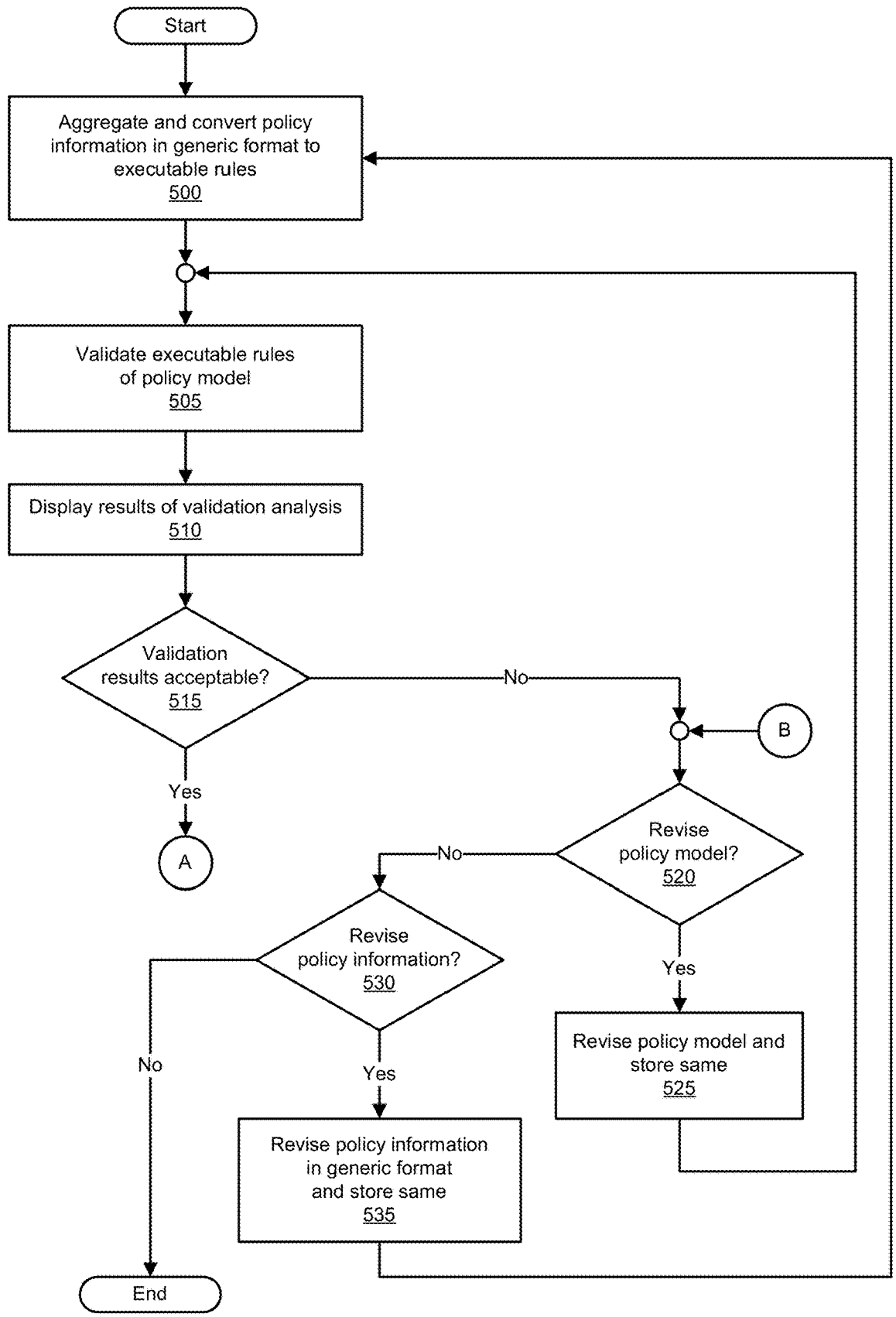
FIGS. 5A and 5B are simplified flow diagrams illustrating an example of a process for generating an executable rulebase, according to embodiments of the methods and systems disclosed herein.
Figure 5B:
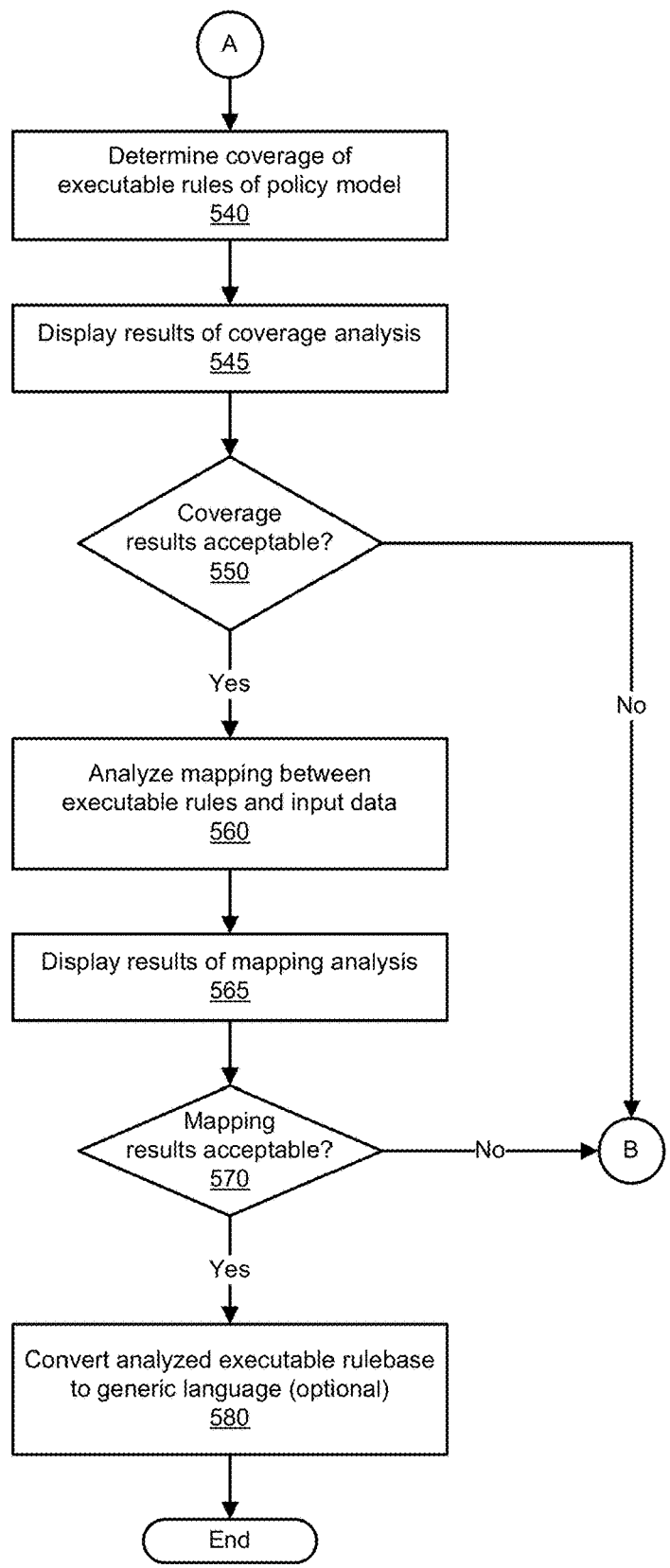

FIGS. 5A and 5B are simplified flow diagrams illustrating an example of a process for generating an executable rulebase, according to embodiments of the methods and systems disclosed herein. As noted in connection with FIG. 4 (and more specifically the generation of an executable rulebase (policy model) at step 450), the process of generating an executable rulebase from one or more processed policy documents (e.g., stored in a generic format), for use in analysis against input data, begins with the aggregation of the processed policy information, and creation of executable rules therefrom (step 500).

At this juncture, a policy analytics architecture as described herein can validate the executable rules of the policy model generated (step 505). The results of such validation analysis can then be displayed, in order to allow a user to review and accept such validation results (step 510). As will be appreciated, the determinations involved in accepting some or all of the validation results can be automated, based on predefined and/or dynamically defined guidelines. If, for some reason, the validation results are not acceptable (or are not completely acceptable), the option is provided to revise or otherwise alter the policy model or policy information. Such policy validation performs operations such as checking for cyclic loops and redundancies, ensuring policies are logically sound (verifiably consistent), streamlining and refining policies, and other such operations. Further, a validation module providing such functionality can provide for the presentation and visualization of policy dependencies in the policy model(s) thus validated. It will be noted that, upon revision of the policy model, the now-revised policy model is once again validated and otherwise vetted, while revision of the policy information in the generic format necessitates the aggregation and conversion of such revised policy information into executable rules of a (now-revised) policy model (step 500).

Once such validation analysis results have been reviewed, a determination is made as to what such validation results are acceptable (step 515). To this end, a determination is made as to whether the executable rules of the policy model or other elements thereof are to be changed (e.g., edited or otherwise revised) (step 520). If the policy model is to be changed, the policy model is revised and the revised policy model is stored (step 525). The revised policy model can then be validated, and other associated analyses performed (e.g., steps 505, 510, and 515). If, for example, the user does not wish to revise the policy model directly, a determination is made as to whether the policy information in the generic format is to be manipulated (step 530). If the user, for example, wishes to make alterations to the policy information in the generic format (step 530), the policy analytics architecture allows for revision of the policy information in the generic format and storage thereof (step 535). In a manner similar to that of revision of the policy model, the process then proceeds to the aggregation and conversion of this revised policy information (still in the generic format) into the executable rules of a revised policy model. In the example presented in FIG. 5A, in the case in which a user does not find the validation results acceptable, but also does not wish to revise the policy model or policy information, an assumption is made that the user no longer wishes to generate the policy model, and thus the generation process concludes.

In the case in which the validation results thus generated are deemed acceptable (step 515), the process proceeds (via the connector in FIG. 5A marked "A") to a determination as to the coverage of the executable rules of the policy model (540). In performing such determinations, a policy analytics architecture according to embodiments described herein analyze the policy models thus generated (as well as, e.g., test scripts, data files, and input files) against the policy models thus generated, in order to find and address gaps in test coverage with respect to the policy documents that form the basis of the present analysis. For example, live data can be run against the policy models thus generated, and a coverage report generated therefrom. Coverage can be indicated with respect to the executable rule(s) thus generated, portions of the policy documents used as a basis for the analysis, and other such bases, and thereby indicate document, sections, policies, and the like that are either not fully tested or not fully exercised during the processing and analysis. Further, coverage can be analyzed with respect to goals of the policy model (e.g., by identifying unexercised conditions, irrelevant conditions, and the like). The results of such coverage analysis are then displayed (step 545), allowing a user to review these coverage analysis results.

As will be appreciated in light of the present disclosure, some or all of such review of coverage analysis results can be automated, and thus examined with regard to guidelines pertaining thereto. Coverage analysis having been performed and results thereof presented, a determination is then made as to whether the coverage analysis results are acceptable (step 550). In the case in which the coverage results are not acceptable, the process proceeds (via a connector "B" to FIG. 5A) a determination as to whether the policy model is to be revised (step 520). As before, the policy model can be revised and stored (step 525) and the process repeated (starting at step 500).

If the policy model thus generated has been validated and provides acceptable coverage, the mapping(s) between the executable rules of the policy model and the schema used by the input database in maintaining the input data are analyzed (step 560). Such mapping(s) provide, for example, an integration object that maps components and fields of the input data to entities, attributes, relationships, and the like of the policy model's executable rules. Results of such mapping analyses can be displayed for review by, for example, a user (step 565), or can be used as input to automated processes that can analyze (e.g., dynamically or statically) the acceptability of such mapping(s), and thus identify any discrepancies therebetween (step 570). In the case in which some or all of these mapping(s) are determined to be unacceptable, the process of executable rulebase generation provides (via connector "B") the option to revise the policy model (steps 520 and 524), revise the policy information (steps 530 and 535), or to terminate the process, in the manner noted previously. The policy model, having been thus validated and analyzed, is now prepared for use in analyzing one or more policy scenarios. Optionally, the policy model's executable rules can be converted into a generic language, such as a mark-up language (e.g., HTML, XML, or the like) (step 580).

Figure 6:
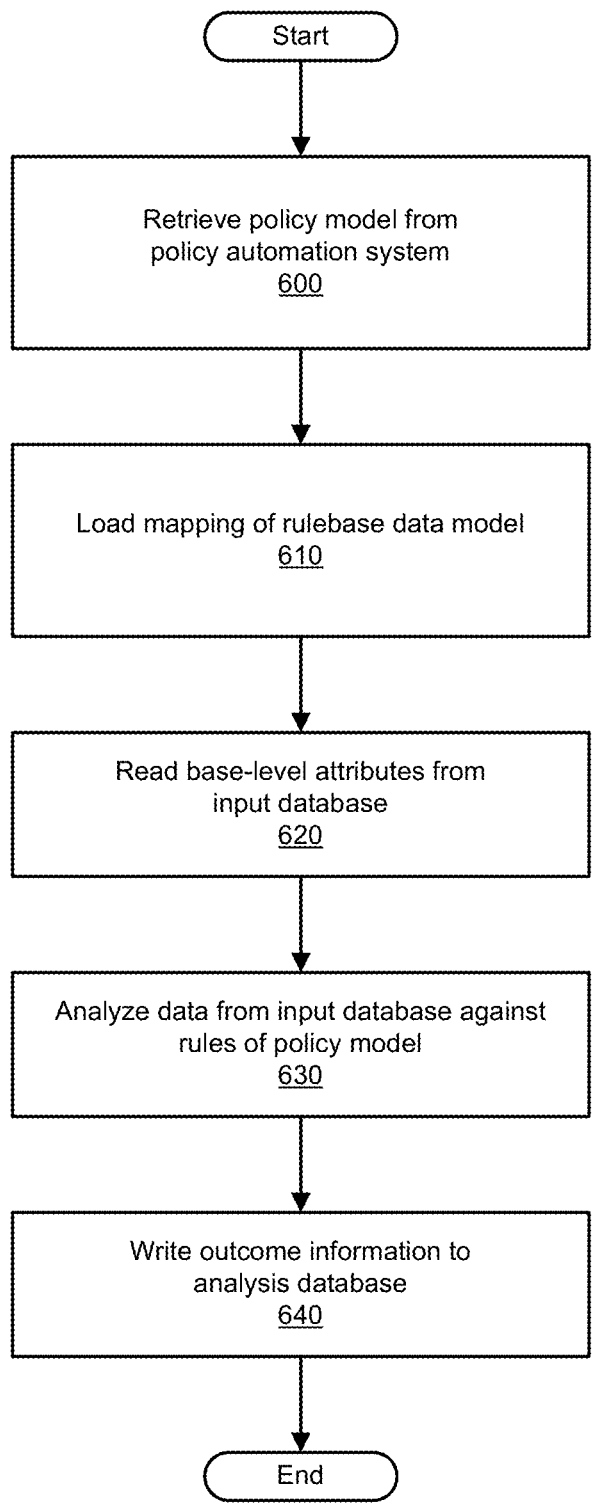
FIG. 6 is a simplified flow diagram illustrating an example of a process for performing a policy analysis using a policy model, according to embodiments of the methods and systems disclosed herein.

FIG. 6 is a simplified flow diagram illustrating an example of a process for performing a policy analysis using a policy model, according to embodiments of the methods and systems disclosed herein. The requisite policy model(s) having been generated (and, possibly, revised as necessary) and input data retrieved from the input database, the policy model can now be retrieved from the policy automation system (step 600). Next, information regarding the mapping of the rulebase's data model is loaded (step 610). As noted, such a mapping identifies correspondences between the rules of the policy model and the data retrieved from the input database. Thus, the policy model's (rulebase's) data model is mapped onto the database schema of the input database. Base-level attributes are then read from the input database (step 620). Data from the input database is then analyzed against the rules of the policy model (step 630). Once this analysis is complete, outcome information resulting from such analysis is stored in the analysis database (step 640). In outputting the result of an analysis process such as that described in connection with FIG. 6, analysis results can be presented in a textual and/or graphical format. To this end, the process depicted in FIG. 7 provides for the textual and/or graphical presentation of such analysis results.

Figure 7:
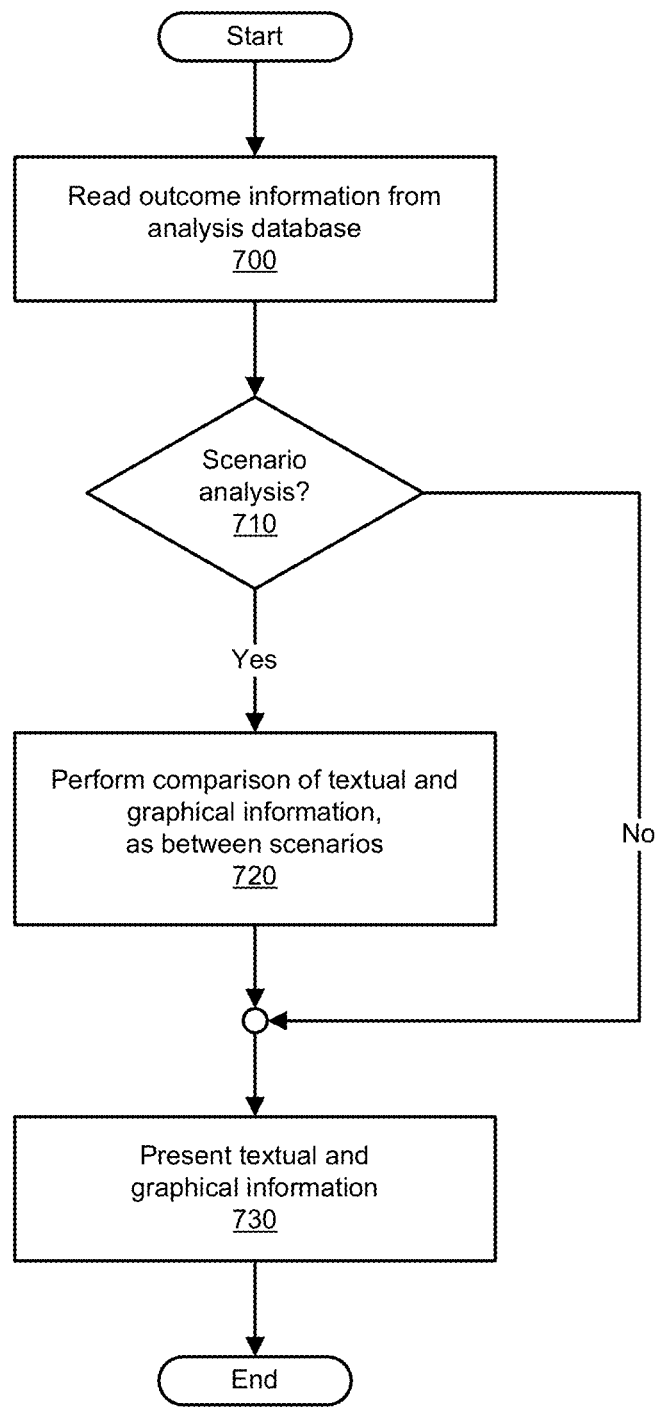
FIG. 7 is a simplified flow diagram illustrating an example of a process for presenting the results of a policy analysis using a policy model, according to embodiments of the methods and systems disclosed herein.

FIG. 7 is a simplified flow diagram illustrating an example of a process for presenting the results of a policy analysis using a policy model, according to embodiments of the methods and systems disclosed herein. The process depicted in FIG. 7 begins with reading outcome information from the analysis database (step 700). Next, a determination is made as to whether the analysis performed was a scenario analysis (step 710). If the analysis performed was a scenario analysis, a comparison between the textual and/or graphical information, as between scenarios, can be performed, in order to highlight discrepancies between the scenarios analyzed (step 720). In any event, the information thus generated (whether the outcome information itself and/or scenario comparisons), the textual and graphical information representing such analyses is presented (step 730).

The analysis policy model can be used to inform formatting of the resulting values, for example:
the data type of outcomes in the policy model;
reporting on a statement outcome can be displayed as a percentage for averages, and a numeric value as a sum; and/or
grouping by a statement outcome can use the natural language for that statement.

Figure 8:
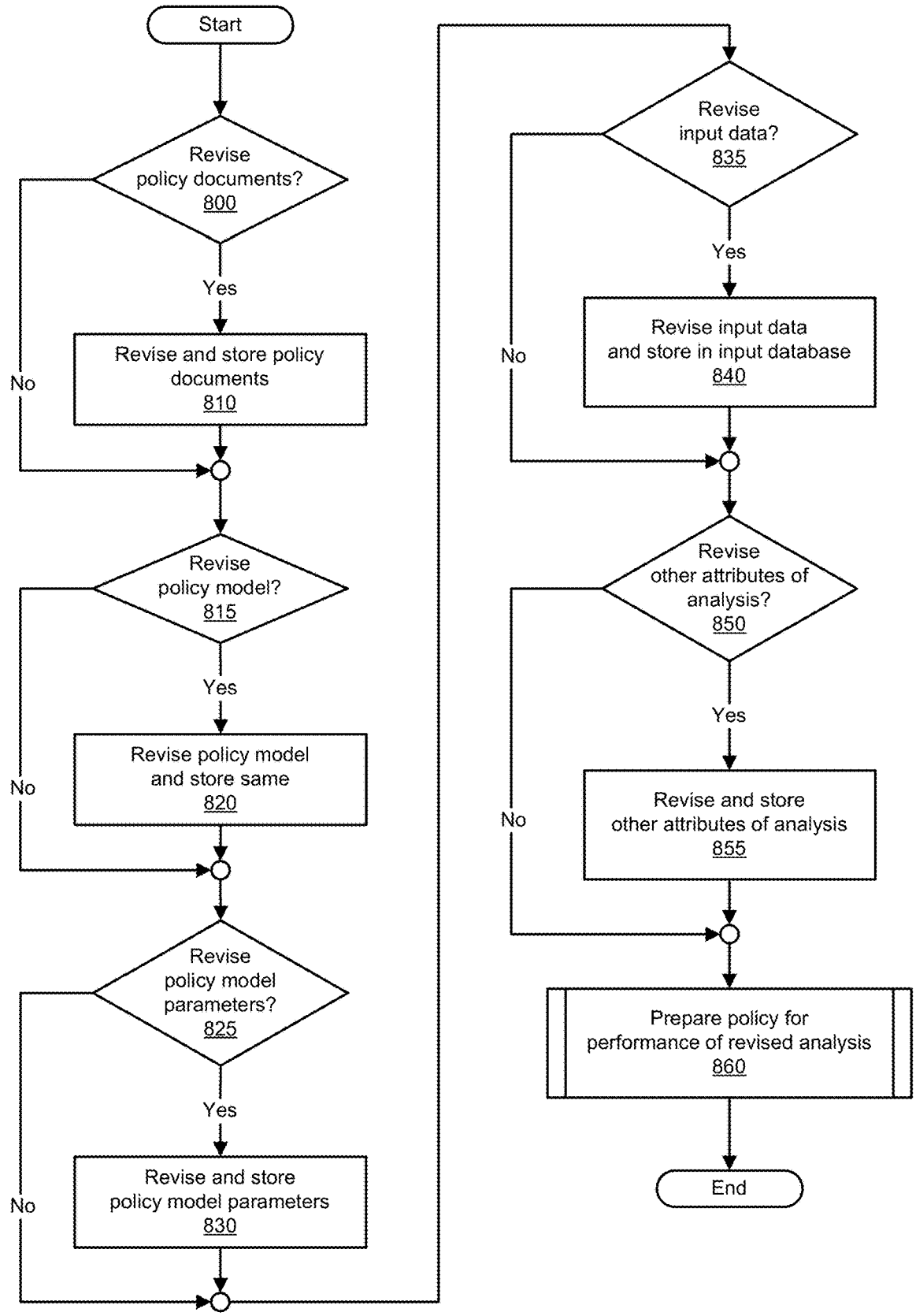
FIG. 8 is a simplified flow diagram illustrating an example of a process for revising a policy analysis using a policy model, according to embodiments of the methods and systems disclosed herein.

FIG. 8 is a simplified flow diagram illustrating an example of a process for revising a policy analysis using a policy model, according to embodiments of the methods and systems disclosed herein. The process of analysis revision, as depicted herein, is generally divided into two primary sets of operations, the making of the revisions to the various aspects of the policy analysis, and the regeneration of portions of that analysis, as necessitated by the revisions at hand. As is illustrated in FIG. 3, once the process model analysis has been performed and the outcomes from such analyses presented (as noted in connection with the discussion of FIG. 3), revision of various of the aspects of a policy analysis (such as that presented in connection with FIG. 3) may prove desirable and/or illuminating. That being the case, and as depicted in FIG. 3, the revision of such analyses may prove beneficial. As noted in the discussion of FIG. 3, this process is, typically, sequential in nature, and so the user in such situations will repeat a cycle of performing modeling analysis, followed by revising some aspect(s) of the policy model/analysis, viewing the results of the revised analysis, and so on. Thus, as in connection with the analysis revision noted in FIG. 3 (step 370), the revision process of FIG. 8 is now described.

This revision process depicted in FIG. 8 begins with a determination as to whether the policy documents that form the basis of such analysis are to be revised (step 800). If the policy documents are to be revised, such revisions are made and the revised policy documents stored, for example, for input to the policy modeling system (e.g., policy modeling system 220) (step 810). In any event, a determination is then made as to whether revisions are to be made to the policy model being analyzed (step 815). In the case in which the policy model is to be revised, such revisions are made to the policy model and the revised policy model stored, for example, by the policy automation system (e.g., policy automation system 230) (step 820). Revisions having been made to the policy documents and/or policy model, as desired (if at all), a determination is then made as to whether any changes to one or more of the policy model parameters are desired (step 825). Such parameters can include configuration parameters such as locale, user information, case information, and the like, and can also include batch processing parameters, information regarding layout and appearance, parameters related to the analysis performed (e.g., income thresholds, cost thresholds, iterations, and so on), and the like. In certain embodiments, for example, policy experts in the given domain are able to set parameters which allow users to configure those parameters when working in the analysis workspace. Further, such an approach can also be used to turn "on" or "off" sections of policies, thereby allowing "what-if" scenarios to be performed in which only portions of a given policy are enacted. Such revisions can thus be implemented and stored as revised policy model parameters (step 830).

Next, a determination is made as to whether the input data (either as received from the input database, or as such data exists within the input database) is to be revised (step 835). If so, the input data is revised and stored, for example, in the input database (step 840). As just noted, certain revisions to input data may be effected with, for example, the values of the data itself. Other such revisions may be performed with regard to the organization of such data (and thus, be effected as changes to the input database). At this juncture, the distinction between revisions to input data and revisions to the process of analyzing that input data are to be appreciated in view of the present disclosure. That being the case, while changes to the input data can prove illuminating as to the effects of the policies and the results that implementation of such policies portend in given situations, changes to various aspect of the policies themselves (e.g., via changes to policy parameters, policy documents, and other such aspects of a given policy) provide the user with addition insight to the effects and desirability of such policies.

At this juncture, a determination can be made as to whether any other attributes of the given policy analysis are to be changed (step 850). If such changes are to be made to these policy attributes, such changes are effected and the affected information stored appropriately (step 855). Revisions to the policy and its various aspects having been made, the policy is prepared for the performance of a revised analysis based thereon (step 860), and the process concludes.

Figure 9:
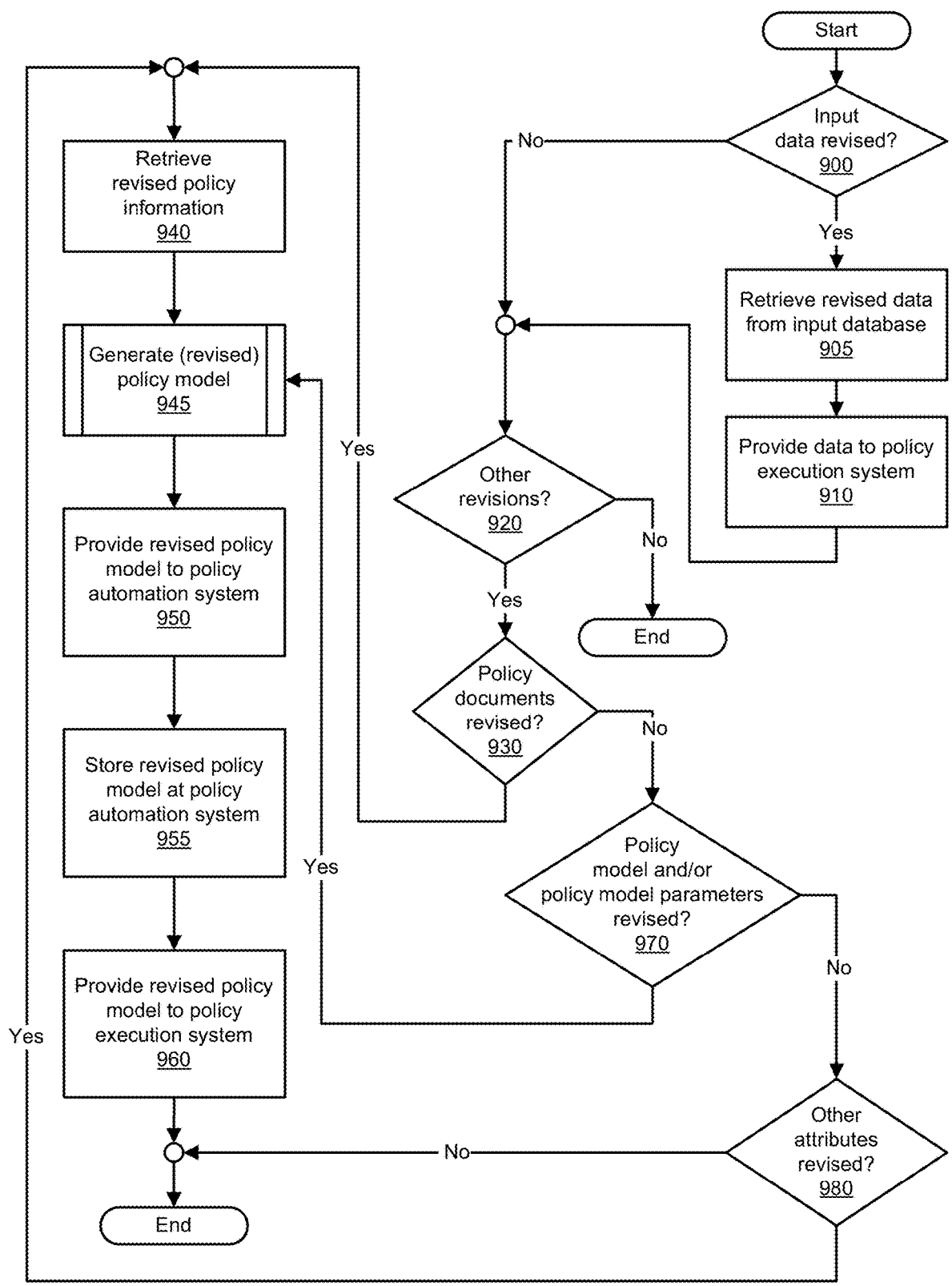
FIG. 9 is a simplified flow diagram illustrating an example of a process for preparing a revised policy analysis, according to embodiments of the methods and systems disclosed herein.

FIG. 9 is a simplified flow diagram illustrating an example of a process for preparing a revised policy analysis, according to embodiments of the methods and systems disclosed herein. FIG. 9 provides an example of the operations that can be performed in preparing a policy model for analysis, after that policy model has been revised. Such a process takes into consideration the point at which (e.g., in a process such as that depicted in FIG. 3). Thus, such processes being directed to changes made to the process model in question generally, as well as the input data generally, a process such as that depicted in FIG. 9 assumes the performance of analysis and outcome presentation (depicted in FIG. 3 as perform analysis 340 and output results 350) being performed subsequent to the operations depicted in FIG. 9. That being the case, the process of FIG. 9 begins with a determination as to whether the input data has been revised (step 900). If the input data and/or its organization have been revised, the revised data is retrieved from the input database (step 905). The revised data thus retrieved is then provided to the policy execution system (step 910). Once the revised data has been thus retrieved and provided, or no such changes made, determination is made as to whether other revisions were performed (step 920). If no other revisions were performed, the process concludes.

If other revisions need to be accounted for (step 920), a determination is made as to whether any of the policy documents were changed (step 930). In the case in which changes have been made to the relevant policy documents, the process proceeds to retrieving the revised policy information (step 940). The revised policy information having been retrieved, the policy modeling system proceeds with generating a revised policy model (step 945). It will be appreciated that such policy model generation is intended to be comprehended by the process of generating an executable rule base (policy model), such as is depicted in FIG. 4 (as step 450), as well as relevant portions of FIGS. 5A and 5B.

In a manner comparable to that depicted in the process of FIG. 3, the process of FIG. 9 proceeds to the provision of the revised policy model, now generated, to the policy automation system (step 950). As before, the policy automation system stores the revised policy model (step 955), subsequently providing the revised policy model to the policy execution system for analysis against data from the input database (step 960).

Returning to the determination as to whether the policy documents have been revised (step 930), if the policy documents have not been revised, a determination is made as to whether any revisions were implemented with respect to the policy model and/or policy model parameters (step 970). If the policy model and/or policy model parameters have been revised, the process of FIG. 9 depicts the assumption that a revised policy model will need to be generated. That being the case, the process proceeds to the generation of the revised policy model (step 945). As before, the generation of the revised policy model is performed in a manner comparable to that of earlier figures. Also as before, the revised policy model thus generated is provided to the policy automation system (step 950), and stored by the policy automation system (step 955) for ultimate provision to the policy execution system (step 960).

In the case in which no revisions have been made to the policy documents, policy model, or policy model parameters (steps 930 and 970), a determination is made as to whether any revisions were made to any other of the policy analysis' attributes (step 980). As depicted in FIG. 9, if other of the policy analysis' attributes have been changed, policy proceeds with performing the generation and analysis of the policy model as described above with regard to changes to the policy documents, assuming that any such changes necessitate these operations. Once the aforementioned determinations have been made and any operations necessitated thereby performed, the process concludes.

Figure 10:
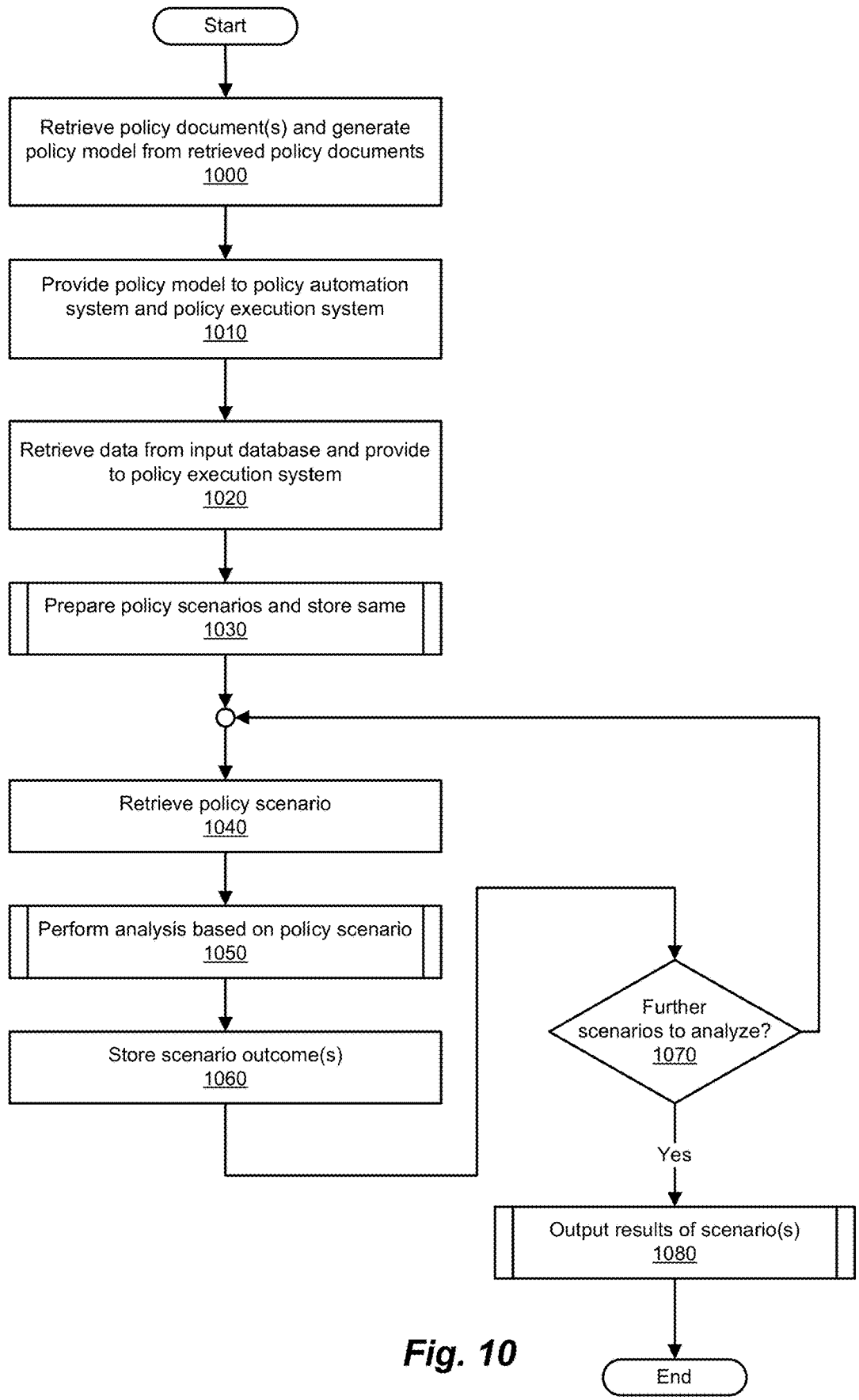
FIG. 10 is a simplified flow diagram illustrating an example of a process for preparing and performing policy analysis on policy scenarios, according to embodiments of the methods and systems disclosed herein.

FIG. 10 is a simplified flow diagram illustrating an example of a process for preparing and performing policy analysis on policy scenarios, according to embodiments of the methods and systems disclosed herein. As will be appreciated in light of the present disclosure, the process for policy analysis depicted in FIG. 10 provides a general example of scenario-based policy analysis that is comparable in many respects to the policy analysis operations depicted in FIG. 3. A distinction between these two processes is that, as noted, the process depicted in FIG. 3 takes a more iterative approach (allowing, by user and/or automation, revisions to be made thereby and outcomes generated, in an iterative fashion), as opposed to the process of FIG. 10, which facilitates the preparation and analysis of multiple scenarios (each of which include the aforementioned revisions), and thus supports the examination of the potential differences therebetween. Such a process thus supports, generally the creation of various scenarios for each policy option used as a variable of sorts for driving the policy analyses to be performed, with a scenario created to represent the outcome(s) of each policy variation. By allowing a user to set scenarios for various policy models and variations thereof, it becomes possible to compare completely different policies and their outcomes.

A scenario-based process such as that depicted in FIG. 10 begins with the retrieval of one or more policy documents and the generation of one or more policy models therefrom (step 1000). Next, the policy model thus generated is provided to, for example, the policy automation system and policy execution system (step 1010). The requisite data is then retrieved from the input database and provided to the policy execution system (step 1020). The scenarios are then prepared (step 1030). The preparation of scenarios is discussed in greater detail in connection with FIG. 11.

The scenarios having thus been prepared and stored, the policy execution system then proceeds to execute these scenarios by retrieving a given scenario to be analyzed (step 1040). Policy analysis is then performed based on this scenario (step 1050). Such policy analysis can be performed, for example, in the manner described with respect to policy analysis operations discussed earlier, e.g., in connection with FIG. 6. Once the policy scenario has been analyzed, the outcome(s) of the given policy scenario are stored (step 1060). A determination is then made as to whether further policy scenarios remain to be processed (step 1070). As will be appreciated in light of the present disclosure, the process of FIG. 10 then proceeds to the next policy scenario for analysis (and so proceeds to retrieving the next scenario (step 1040), and so on). Once all of the desired policy scenarios have been analyzed, analysis results (outcomes) for the policy scenarios analyzed are presented to the user (step 1080).

Figure 11:
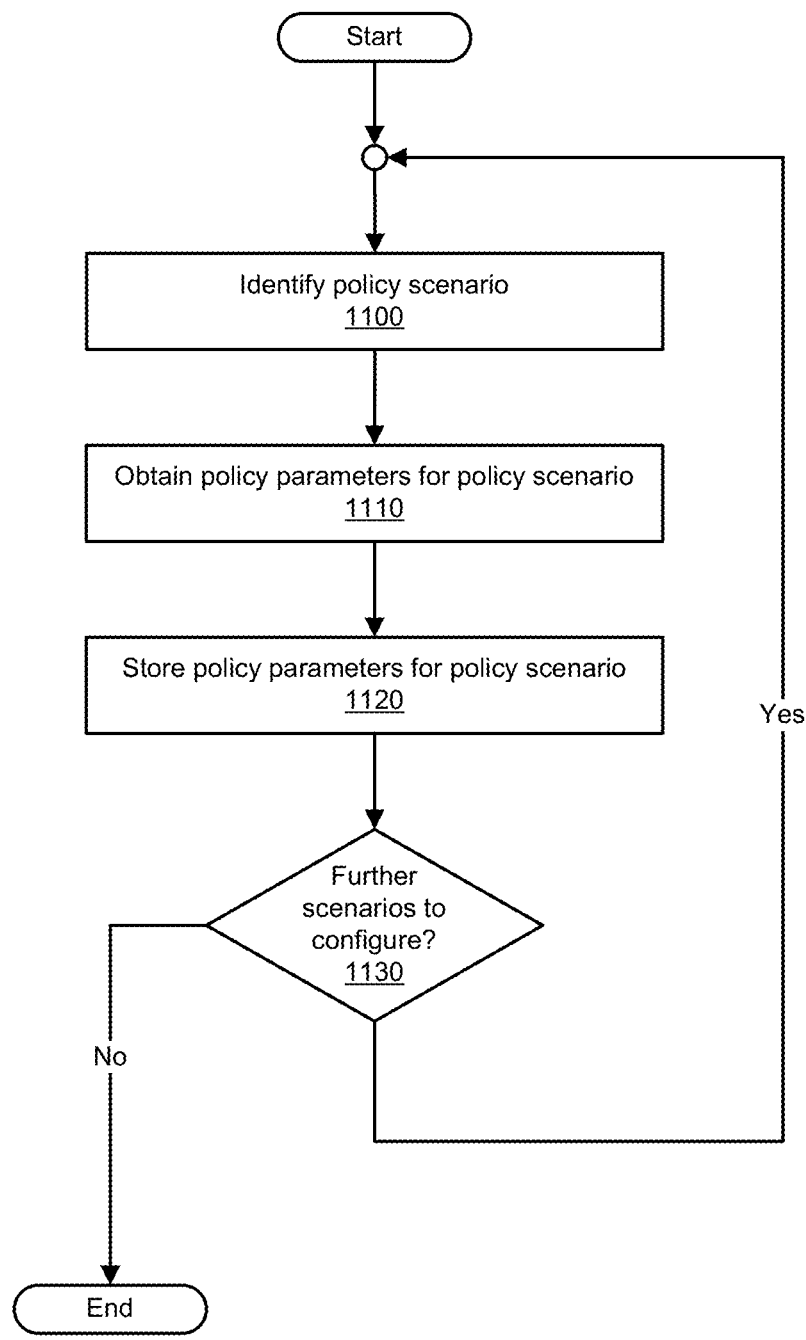
FIG. 11 is a simplified flow diagram illustrating an example of a process for preparing policy scenarios, according to embodiments of the methods and systems disclosed herein.

FIG. 11 is a simplified flow diagram illustrating an example of a process for preparing policy scenarios, according to embodiments of the methods and systems disclosed herein. Given that the scenario analysis process of FIG. 10 is iterative in nature, a number of policy scenarios will typically be prepared for sequential analysis, for example, by the policy execution system (and more specifically, the analysis server), running such scenarios against data from the given input database. That being the case, preparation of such policy scenarios is itself iterative in nature. The process of policy scenario preparation thus begins with the identification of the policy scenario to be prepared (step 1100). Policy parameters for the given policy scenario are then obtained (step 1110). The policy parameters, as well as any other information needed for analyzing the policy scenario at hand, are then stored (e.g., by a policy automation system such as policy automation system 230) (step 1120). A determination is then made as to whether further policy scenarios are to be configured (step 1130). If further policy scenarios remain to be configured, the policy scenario preparation process of FIG. 11 returns to the identification of the next policy scenario to be prepared (step 1100) and continues in this fashion until the desired policy scenarios have been configured, at which point the process of policy scenario preparation concludes (step 1130).

Figure 12:
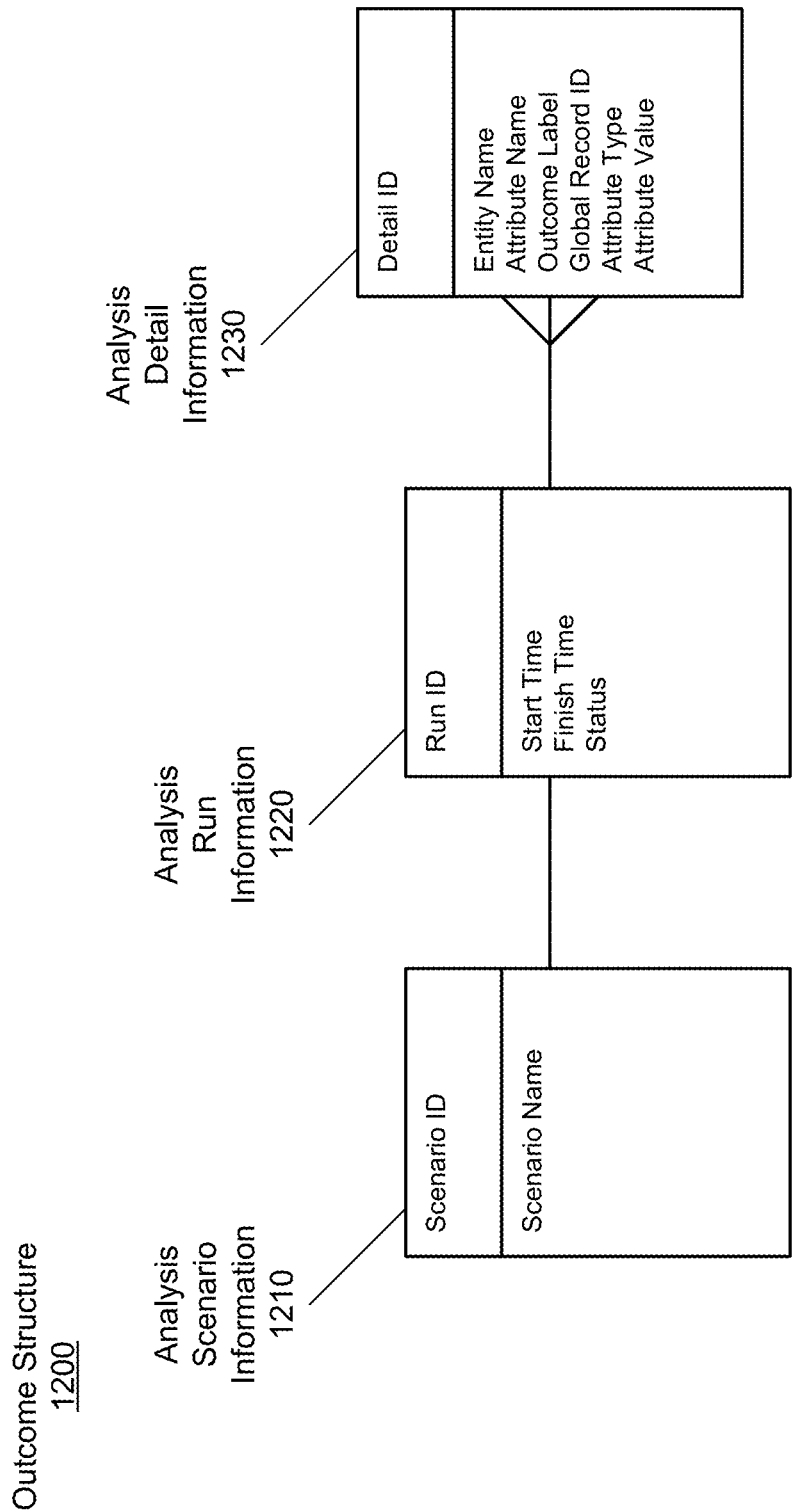
FIG. 12 is a simplified block diagram illustrating an example of an outcome structure, according to embodiments of the methods and systems disclosed herein.

FIG. 12 is a simplified block diagram illustrating an example of an outcome structure, according to embodiments of the methods and systems disclosed herein. A policy analysis database (e.g., as might be stored in analysis database 270) thus provides for policy analysis mark-up. Such policy analysis mark-ups (defining the input mappings, parameters and outcomes) can be included in the policy model compiled by a policy modeling system such as policy modeling system 220, and uploaded to a policy automation system such as policy automation system 230. When a policy model is retrieved from the policy automation system 230 by an analysis server (e.g., analysis server 255), the analysis mark-up is unpacked for use when creating, editing, or processing the associated policy scenarios. As can be seen in FIG. 12, an analysis server such as analysis server 255 can employ a simple database structure to store the outcomes generated by processing an analysis scenario, as is depicted in FIG. 12.

FIG. 12 thus depicts an outcome structure 1200 which is an example of a simplified logical representation of a database that can be used in storing policy outcomes (e.g., such as analysis database 270 of FIG. 2). As depicted in FIG. 12, outcome structure 1200 includes information regarding an analysis scenario (depicted in FIG. 12 as analysis scenario information 1210), information regarding a policy analysis run for the analysis scenario (depicted in FIG. 12 as analysis run information 1220), and one or more analysis detail packages for each analysis run (depicted in FIG. 12 as analysis detail information 1230). As depicted in FIG. 12, analysis scenario information 1210 maintains identifying information regarding the scenario, such as a scenario identifier (typically provided by the policy analysis system) and scenario name (typically provided by the user). Similarly, analysis run information 1220 provides information regarding the policy analysis run, including, for example, start time, finish time, and status of the policy analysis run. Analysis detail information 1230 maintains information regarding the details of the policy analysis, including, for example, an identifier for the information, the name of the entity performing the analysis (the entity name), an attribute name, an outcome label (to allow for easy identification of the given outcome), a global record identifier, an attribute type and an attribute value (describing the attribute in question), and other such information.

It will be appreciated that, in view of FIG. 12, one or more analysis detail packages can be maintained for each policy analysis run. Thus, outcome structure 1200 provides a simple, generic database structure that can be used to store the outcomes generated by performing policy processing on a given analysis scenario. Using such a structure, analysis scenario information 1210, analysis run information 1220, and analysis detail information 1230 allow for the association of an analysis run with a policy scenario. This provides a container for the outcomes associated with a scenario, and thus the ability to access such information in one location. In certain embodiments, when a new scenario is created, analysis run information such as analysis run information 1220 is generated contemporaneously. When such a policy scenario is edited or a change made to the policy model associated with the policy scenario, a policy analytics architecture such as those described previously can delete the current analysis run (and thus, analysis run information 1220) along with any associated analysis detail packages (e.g., analysis detail information 1230), and initiate a new analysis run (and so, the creation of new versions of analysis run information 1220 and analysis detail information 1230). On one embodiment, upon the initiation of an analysis run, the policy analysis process uses the input mappings provided by the policy model to construct the cases of interest. For each case processed, the value of each attribute identified as an outcome is recorded in an analysis detail package (e.g., such as analysis detail information 1230).

Figure 13A:
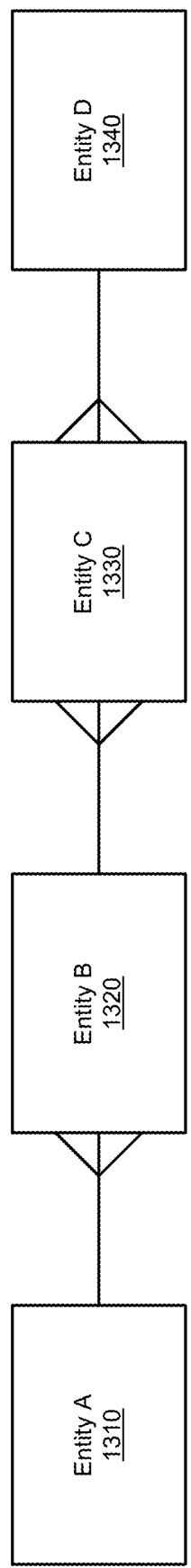
FIG. 13A is a simplified block diagram illustrating an example of a source logical data schema, according to embodiments of the methods and systems disclosed herein.

FIG. 13A is a simplified block diagram illustrating an example of a source logical data schema, according to embodiments of the methods and systems disclosed herein. FIG. 13A thus depicts a source logical data schema 1300, which is an example of a logical data schema for the outcomes resulting from policy analysis performed on, for example, one or more policy scenarios. Source logical data schema 1300, which presents a logical data schema in generic terms, includes an entity A 1310, an entity B 1320, an entity C 1330, and an entity D 1340. As is illustrated in FIG. 13A, entity A 1310 is able to have relationships with multiple ones of entity B 1320, which, in turn, is able to have relationships with multiple ones of entity C 1330. Similarly, entity D 1340 is able to have relationships with multiple ones of entity C 1330. Conversely, source logical data schema 1300 and the relationships presented therein can be viewed as multiple ones of entity C 1330 having relationships with (e.g., being members of) ones of entity B 1320 and entity D 1340. Similarly, multiple ones of entity B 1320 can be seen as having relationships with (e.g., membership in) ones of entity A 1310 by representing entities in this fashion, embodiments of the methods and systems described herein are able to facilitate, for example, the charting of such relationships. In so doing, policy analysis runs can be aggregated across relevant groupings as, for example, selected by a user using a graphical user interface. With reference to FIG. 12, this allows the fields in a structure such as analysis detail information 1230 to be used to correlate to the original data record, and so allow for grouping against field and outcomes such as:

Fields in the original data that were not used as part of the policy analysis run; and Other outcomes related to that record as part of the same policy analysis run.

In certain embodiments, then, the analysis stored in an analysis detail table such as analysis detail information 1230 can be used as the root records in an implied star schema, allowing aggregation to be performed from any downstream field.

Figure 13B:
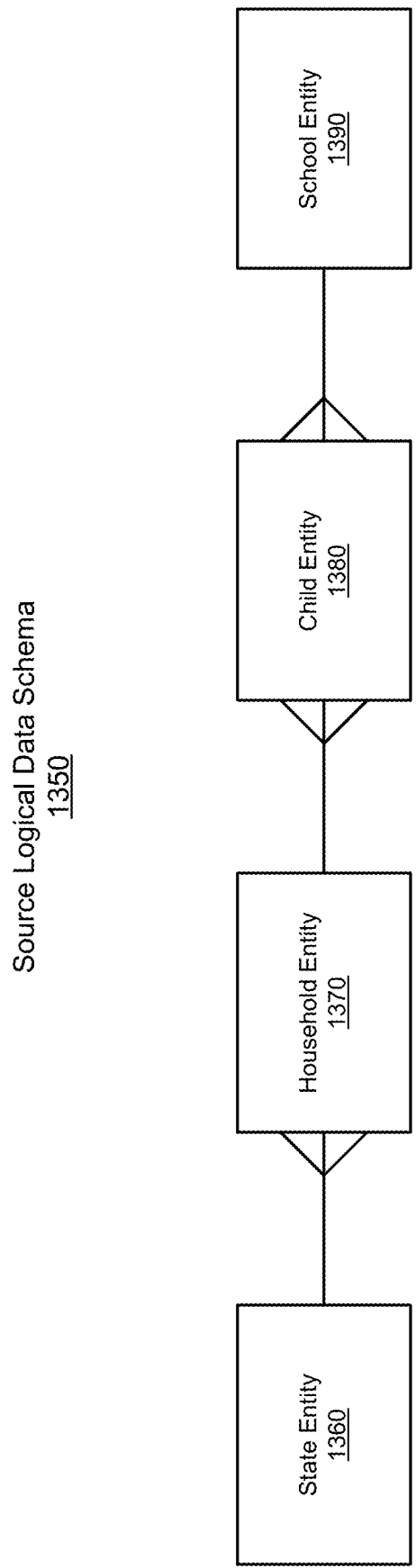
FIG. 13B is a simplified block diagram illustrating an example of a source logical data schema, according to embodiments of the methods and systems disclosed herein.

FIG. 13B is a simplified block diagram illustrating an example of a source logical data schema, according to embodiments of the methods and systems disclosed herein. That being the case, a source logical data schema such as a source logical data schema 1350 of FIG. 13B can be used to address relationships from the perspective of an outcome of a child record, as described in further detail in connection with FIG. 14. In source logical data schema 1350, a state entity 1360, a household entity 1370, a child entity 1380, and a school entity 1390 are depicted. As will be appreciated, some number of child entities (e.g., child entity 1380) can be members of a household entity such as household entity 1370. Some number of such child entity can also be members of a school entity (e.g., school entity 1390). In turn, one or more household entities such as household entity 1370 can be members of a state entity such as state entity 1360. The effects of structures such as those depicted as being of source logical data schema 1350 allow for working with outcomes related thereto in an intuitive and straightforward manner (e.g., examination, aggregation, and other such operations of such entities).

Figure 14:
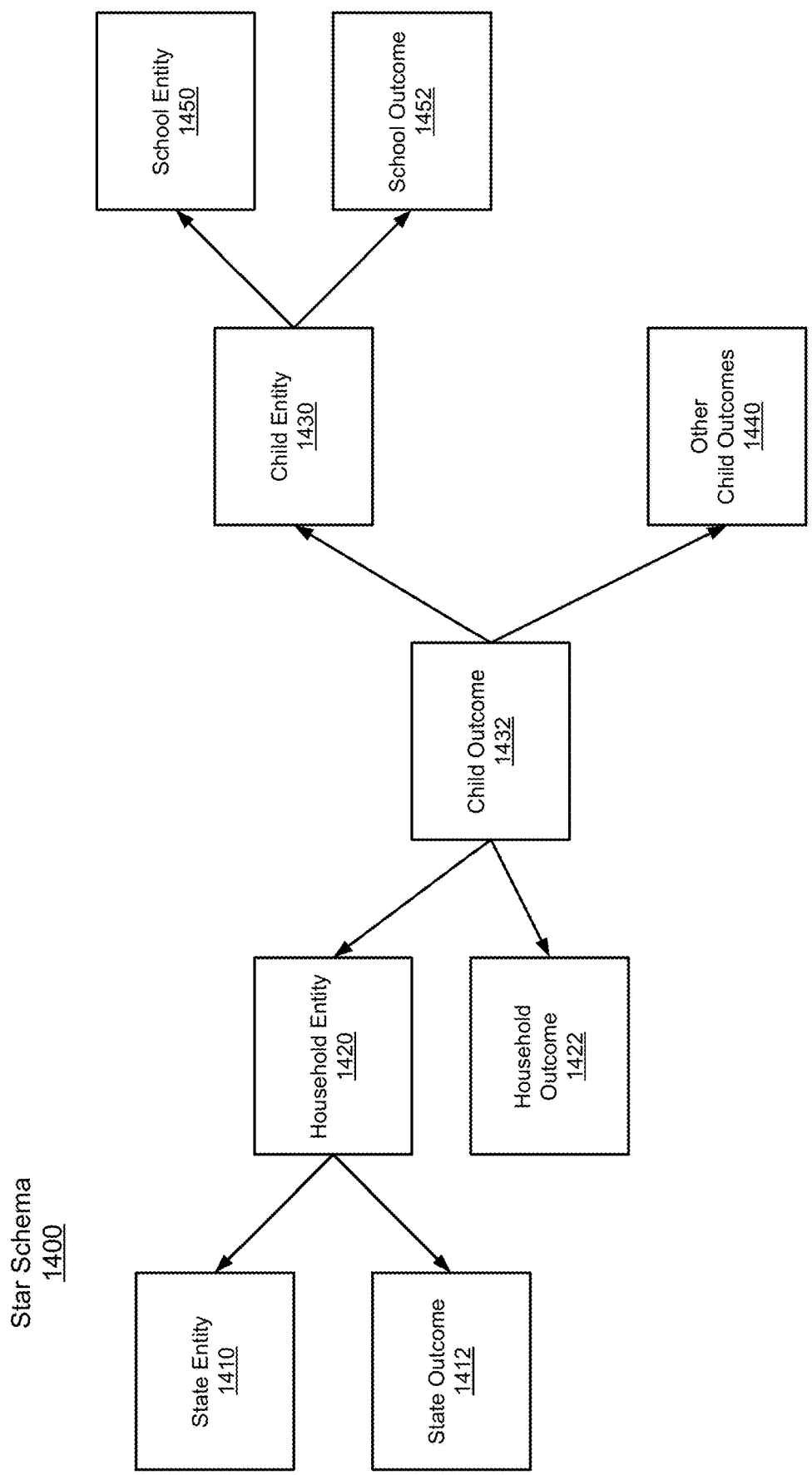
FIG. 14 is a simplified block diagram illustrating an example of a star schema, according to embodiments of the methods and systems disclosed herein.

FIG. 14 is a simplified block diagram illustrating an example of a star schema, according to embodiments of the methods and systems disclosed herein. From the perspective of an outcome of a child record, the schema depicted in FIGS. 13A and 13B imply a star schema for the outcomes related thereto. FIG. 14 thus depicts a star schema 1400 that serves as an example of the manner in which outcomes related to various entity can be organized and manipulated. As can be seen in FIG. 14, star schema 1400 includes a number of entities and their associated outcomes for a given policy model analysis (e.g., one or more policy analysis runs). Star schema 1400 includes a state entity 1410 (and its associated outcome state outcome 1412), a household entity 1420 (and its associated household outcome 1422), and child entity 1430 (and its associated child outcome 1432, as well as other child outcomes 1440, in relation thereto), and a school entity 1450 (and an associated school outcome 1452). Thus, in the case of a given child outcome (e.g., child outcome 1432) such a child outcome can be grouped by a field of the school entity of which the child is a member (e.g., school entity 1450 of which child entity 1430 is a member) by grouping such child entity (and its outcome) by a field that indicates the school entity which the child attends. Alternatively, a give child outcome (e.g., child outcome 1432) can be grouped by a field that takes into account the child entity's household entity's state entity (e.g., grouping child outcome 1432 based on household outcome 1422 and state outcome 1412). Further, an analysis policy model according to embodiments of the methods and systems described herein can also be used to inform formatting of the resulting values. Examples of such formatting include, but are not limited to, the data type of outcomes in the policy model, reporting on a statement outcome displayed as a percentage of averages, providing reporting on a statement outcome using a numeric value as a sum, and grouping by statement outcome using the natural language for that statement.

FIGS. 15-22 are representations of user interface screens that provide examples of an example workflow for using the analysis functionality provided by a policy analytics architecture such as policy analytics architecture 200 of FIG. 2. These figures provide an example overview of a workflow for using the policy analysis functionality provided by embodiments of the methods and systems disclosed herein.

Figure 15:
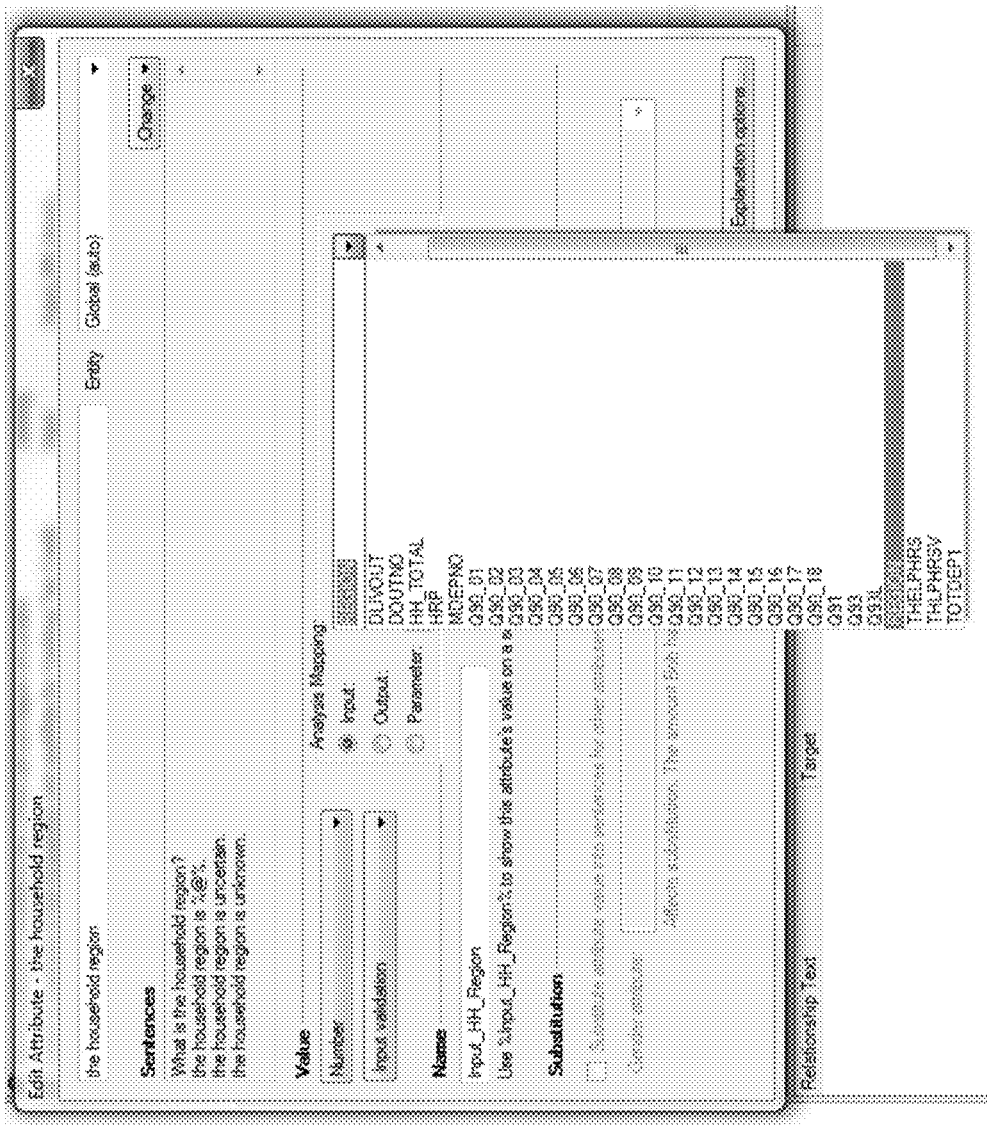
FIG. 15 is a simplified block diagram illustrating an example of a user interface screen, according to embodiments of the methods and systems disclosed herein.

FIG. 15 is a simplified block diagram illustrating an example of a user interface screen, according to embodiments of the methods and systems disclosed herein. FIG. 15 depicts a user interface screen 1500 that illustrates various functionalities related to the mapping of input data. In a policy analytics architecture according to the methods and systems described herein, an analysis server such as analysis server 255 is granted access to an input database such as input database 260, which is configured to provide (a potentially large amount of) case data to the analysis server for use in performing policy analysis operations with respect to one or more policy models provided by, for example, a policy automation system. Upon receiving a request from a policy modeling system such as policy modeling system 220, the analysis server can interrogate the input database, and return metadata (e.g., tables, field, relationships, and the like) that can be used to mark up (designate portions of) the policy model being analyzed. The policy modeling system can present such metadata to a policy analyst or other user, such that the policy analyst or other user can map policy entities and attributes to the database tables and fields to be used as input when creating cases for policy analysis.

In view of the foregoing, user interface screen 1500 provides, among other functionalities, the ability to indicate natural language sentences to be associated with a given entity, values and types of mappings associated therewith, attribute names, (optional) attribute substitutions, and analysis mapping, among other such characteristics. As will be appreciated, while the mappings presented in user interface screen 1500 are shown as employing raw table and field names, such metadata is augmentable to show information such as user-selected names, annotations explaining the type of data in each field, and other such information. Such information can be managed via, for example, a policy automation system such as policy automation system 230. Additionally, such information can be managed by a user accessing a policy analytics architecture by way of a portal (e.g., the functionality provided by portal interface 140 and portal module 150 of FIG. 1) and/or a remote mobile device (e.g., a mobile interface such a mobile interface 142 of FIG. 1). Further still, such information can be extracted directly from the metadata associated with the underlying input database, if such metadata is available. By providing policy analysts (and other policy experts) with a preview of examples of data that could appear in each of the relevant fields, use of a policy analytics architecture according to the embodiments of the methods and systems described herein is simplified, thereby assisting such policy experts in deciding how such policies (and thus policy models) can be written in view of the available input data.

FIG. 16 is a simplified block diagram illustrating an example of a user interface screen, according to embodiments of the methods and systems disclosed herein. FIG. 16 illustrates a user interface screen 1600 that is an example of the presentation of outcome. Using such information, policy authors can identify the policy attributes to be reported as policy analysis outcomes and/or exposed as policy analysis parameters, operations that can be effected via, for example, the policy modeling system. Such outcomes and parameters can be identified using, for example, plain text fields. In this regard, user interface screen 1600 outcomes that are to be the output for recordation for each case during the analysis processing are presented. Such outcomes in being presented are made available for query analysis subsequent to the policy analysis process.

Figure 17:
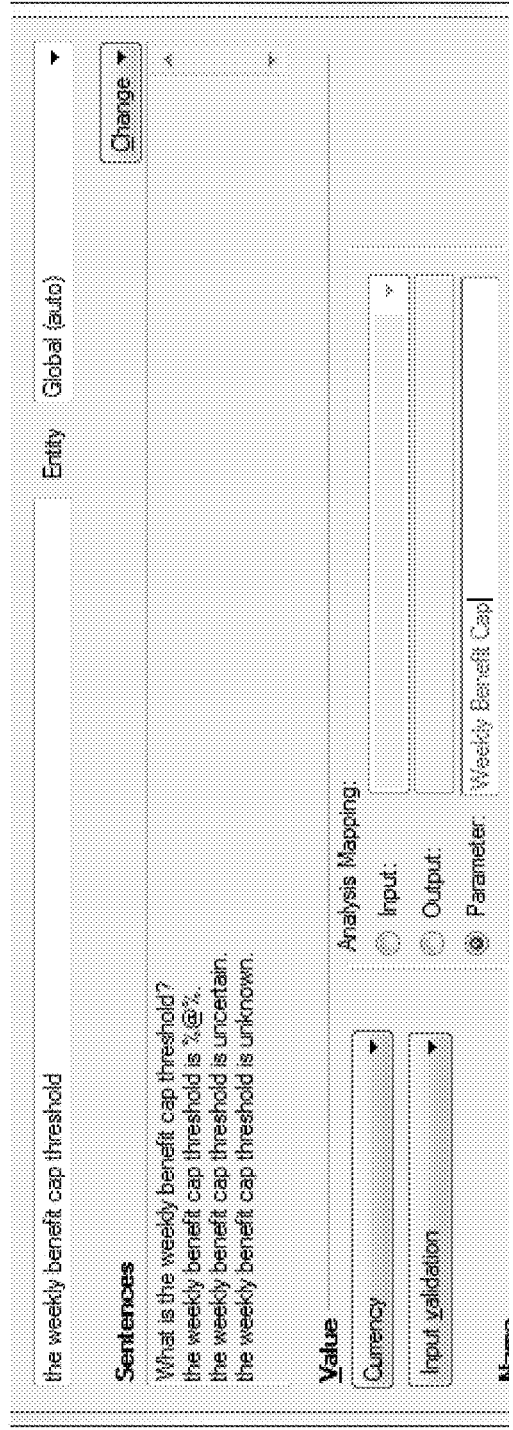
FIG. 17 is a simplified block diagram illustrating an example of a user interface screen, according to embodiments of the methods and systems disclosed herein.

FIG. 17 is a simplified block diagram illustrating an example of a user interface screen, according to embodiments of the methods and systems disclosed herein. FIG. 17 illustrates a user interface screen 1700 that reflects various parameters of the policy model exposed for manipulation by policy analysts. Policy model parameters act as the external inputs that allow policy analysts and other business users to interact with a published policy model, in order to control flow in the manner in which the policies (as defined in the policy documents, and reflected in the policy models generated) are applied to a given case. In certain embodiments, such policy model parameters can be changed as between cases, or set for use across a number of cases. As can be seen in user interface screen 1700, a user (policy analyst or other user) can use the policy model parameters presented to alter the operation and analysis of the policy model, and by choosing one or more values for these policy model parameters, direct the manner in which such policy models are applied to the case(s) in question.

FIG. 18 is a simplified block diagram illustrating an example of a user interface screen, according to embodiments of the methods and systems disclosed herein. As noted elsewhere herein, policy models can be configured to contain policy analysis mark-ups, which can be loaded into an associated repository provided, for example, by the policy automation system. In order to load a policy model into the policy automation system, a connection is created (and maintained) between the analysis server and the policy automation system. Upon publication of a new policy model (e.g., containing a policy analysis mark-up), the analysis server makes the policy analysis available for use in the analysis user interfaces, among them user interface screen 1800. That being the case, in the event of the publication of a change to an existing policy model, the policy analysis scenarios based thereon can be re-processed. In this vein, user interface screen 1800 provides display of various workspaces, which, in turn, allow for the availability to create and manage such workspaces. As will be appreciated in light of the present disclosure, a workspace is a construct that provides the ability to group related policy scenarios, define analysis charts and other graphical representations presenting the outcome of such policy scenarios, and the like. An example of the information that can be provided by such analysis workspaces is presented in connection with FIG. 19.

Figure 19:
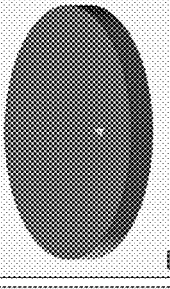
FIG. 19 is a simplified block diagram illustrating an example of a user interface screen, according to embodiments of the methods and systems disclosed herein.

FIG. 19 is a simplified block diagram illustrating an example of a user interface screen, according to embodiments of the methods and systems disclosed herein. FIG. 19 depicts an example of outcomes generated by a process of policy modeling according to the methods and systems described herein, in which both textual and graphical representations are presented to a user for comparison thereof. As noted, workspaces provide the ability to group related policy scenarios, and define analysis charts presenting the outcomes of the policy scenarios, such as those depicted in FIG. 19.

FIG. 20 is a simplified block diagram illustrating an example of a user interface screen, according to embodiments of the methods and systems disclosed herein. FIG. 20 depicts a user information screen 2000, which provides examples of the capabilities of a policy analytics architecture such as that described herein with respect to creating, editing, and executing policy analysis scenarios. For example, user interface screen 2000 can be presented by an analysis server such as analysis server 255, and in so doing, provide support for such functionalities. Thus, a user interface such as that presented as user interface screen 2000, by an analysis server, provides a method for creating and managing policy scenarios based on the published policy models made available by the associated policy automation system. Such functionalities include setting values of the policy analysis parameters, as defined by the policy model. Further, multiple scenarios can be created for the same policy model, for example, with different policy analysis parameter values altering the outcomes of the analysis of the given policy model(s). The presentation of such scenarios is apparent in the user interface screen depicted in FIG. 21.

FIG. 21 is a simplified block diagram illustrating an example of a user interface screen, according to embodiments of the methods and systems disclosed herein. As noted, multiple scenarios can be created for the same policy model, with different parameter values altering the outcomes of the analysis process. In the user interface screen depicted in FIG. 21, user interface screen 2100, which reflects the outcomes associated with scenarios entitled "Variation 1," "Current Rules," and Test Scenario" thereby providing the ability to compare outcomes as between these scenarios.

In certain embodiments, the policy analysis process is run for a policy scenario in the event of:

The policy scenario is first created,

The policy scenario is edited (e.g., via an analysis server interface), or

A new version of the underlying policy model is published to the policy automation system.

When the policy analysis process in run, a number of operations can be performed:

Existing outcomes recorded against the policy scenario being analyzed can be deleted, The policy analysis process can apply the policy model to cases that can be constructed from the input database using the fields identified by the policy analysis mark-up and the current policy model parameter values, and/or Values of outcome attributes that can be identified by the current version of the policy model, and can be recorded in the analysis database (e.g., analysis database 270) for each case thus constructed.

Figure 22:
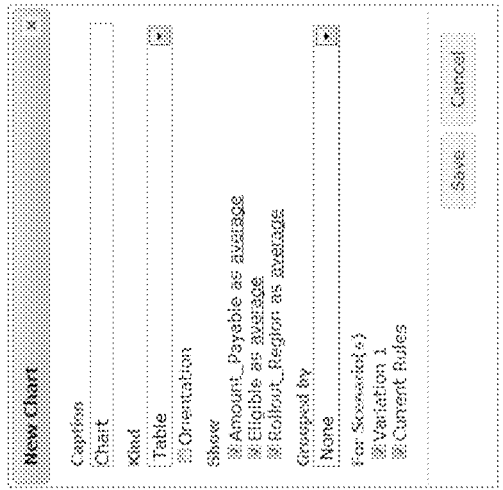
FIG. 22 is a simplified block diagram illustrating an example of a user interface screen, according to embodiments of the methods and systems disclosed herein.

FIG. 22 is a simplified block diagram illustrating an example of a user interface screen, according to embodiments of the methods and systems disclosed herein. FIG. 22 depicts a user interface screen 2200 which provides for the analysis of policy scenario outcomes. User interface screen 2200, and analysis server user interfaces according to the methods and systems described herein, generally, provide the ability to analyze policy scenario outcomes by, for example, defining charts, providing textual information, and other presentations that allow for the examination of distinctions between the policy scenarios thus generated. For example, user interface screen 2200 depicts parameters for use in generating a policy analysis chart. Such a policy analysis chart can be configured to include one or more of the policy scenarios contained in the workspace. The policy analysis chart can thus be configured with aggregation functions for the outcomes defined by the underlying policy models in the workspace, as well as presenting other information relevant to analyzing the policy scenario outcomes at hand.

An Example Computing and Network Environment

As described above, the systems described herein can be implemented using a variety of computer systems and networks. Examples of such computing and network environments are described below with reference to FIGS. 23 and 24.

Figure 23:
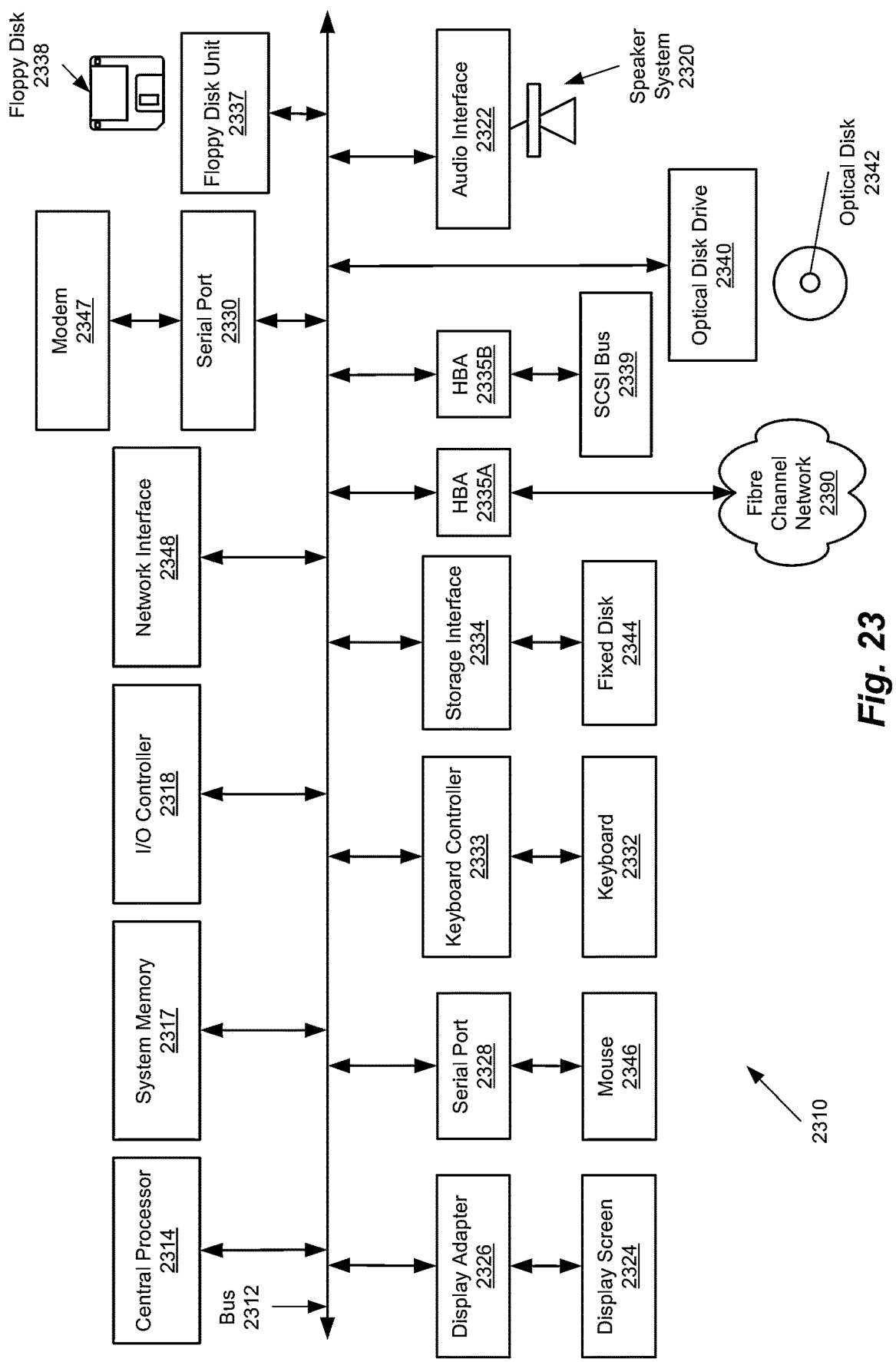
FIG. 23 is a block diagram depicting a computer system suitable for implementing aspects of systems according to embodiments of systems such as those disclosed herein.

FIG. 23 depicts a block diagram of a computer system 2310 suitable for implementing aspects of the present invention. Computer system 2310 includes a bus 2312 which interconnects major subsystems of computer system 2310, such as a central processor 2314, a system memory 2317 (typically RAM, but which may also include ROM, flash RAM, or the like), an input/output controller 2318, an external audio device, such as a speaker system 2320 via an audio output interface 2322, an external device, such as a display screen 2324 via display adapter 2326, serial ports 2328 and 2330, a keyboard 2332 (interfaced with a keyboard controller 2333), a storage interface 2334, a floppy disk drive 2337 operative to receive a floppy disk 2338, a host bus adapter (HBA) interface card 2335A operative to connect with a Fibre Channel network 2390, a host bus adapter (HBA) interface card 2335B operative to connect to a SCSI bus 2339, and an optical disk drive 2340 operative to receive an optical disk 2342. Also included are a mouse 2346 (or other point-and-click device, coupled to bus 2312 via serial port 2328), a modem 2347 (coupled to bus 2312 via serial port 2330), and a network interface 2348 (coupled directly to bus 2312).

Bus 2312 allows data communication between central processor 2314 and system memory 2317, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 2310 are generally stored on and accessed via a computer-readable medium, such as a hard disk drive (e.g., fixed disk 2344), an optical drive (e.g., optical drive 2340), a floppy disk unit 2337, or other storage medium. Additionally, applications can be in the form of electronic signals modulated in accordance with the application and data communication technology when accessed via network modem 2347 or interface 2348.

Storage interface 2334, as with the other storage interfaces of computer system 2310, can connect to a standard computer-readable medium for storage and/or retrieval of information, such as a fixed disk drive 2344. Fixed disk drive 2344 may be a part of computer system 2310 or may be separate and accessed through other interface systems. Modem 2347 may provide a direct connection to a remote server via a telephone link or to the Internet via an internet service provider (ISP). Network interface 2348 may provide a direct connection to a remote server via a direct network link to the Internet via a POP (point of presence). Network interface 2348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 23 need not be present to practice the present invention. The devices and subsystems can be interconnected in different ways from that shown in FIG. 23. The operation of a computer system such as that shown in FIG. 23 is readily known in the art and is not discussed in detail in this application. Code to implement the present invention can be stored in computer-readable storage media such as one or more of system memory 2317, fixed disk 2344, optical disk 2342, or floppy disk 2338. The operating system provided on computer system 2310 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 24:
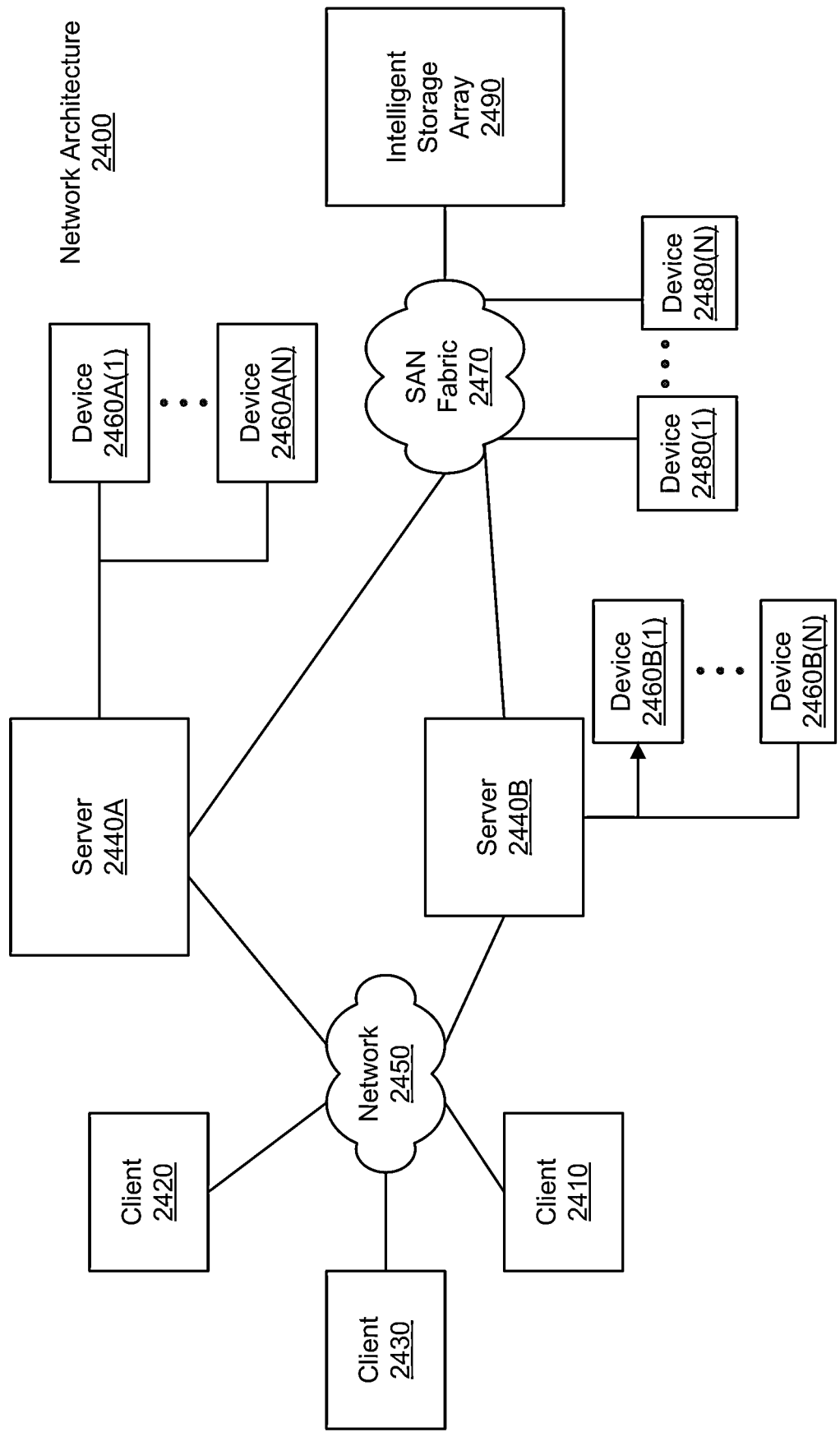
FIG. 24 is a block diagram depicting a network architecture suitable for implementing aspects of systems according to embodiments of systems such as those disclosed herein.

FIG. 24 is a block diagram depicting a network architecture 2400 in which client systems 2410, 2420 and 2430, as well as storage servers 2440A and 2440B (any of which can be implemented using computer system 2410), are coupled to a network 2450. Storage server 2440A is further depicted as having storage devices 2460A(1)-(N) directly attached, and storage server 2440B is depicted with storage devices 2460B(1)-(N) directly attached. Storage servers 2440A and 2440B are also connected to a SAN fabric 2470, although connection to a storage area network is not required for operation of the invention. SAN fabric 2470 supports access to storage devices 2480(1)-(N) by storage servers 2440A and 2440B, and so by client systems 2410, 2420 and 2430 via network 2450. Intelligent storage array 2490 is also shown as an example of a specific storage device accessible via SAN fabric 2470.

With reference to computer system 2410, modem 2447, network interface 2448 or some other method can be used to provide connectivity from each of client computer systems 2410, 2420 and 2430 to network 2450. Client systems 2410, 2420 and 2430 are able to access information on storage server 2440A or 2440B using, for example, a web browser or other client software (not shown). Such a client allows client systems 2410, 2420 and 2430 to access data hosted by storage server 2440A or 2440B or one of storage devices 2460A(1)-(N), 2460B(1)-(N), 2480(1)-(N) or intelligent storage array 2490. FIG. 24 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 2310). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized systems illustrated in the figures described herein.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computer-implemented method comprising:
   creating, by a computing system, a policy model, wherein
      the policy model is configured to represent one or more policy scenarios and includes one or more parameters,
      each of the one or more scenarios is defined, at least in part, by each of the one or more parameters comprising a value or a plurality of values, and
      the policy model is created from one or more policy documents in a natural language format by performing natural language processing using at least a syntactic parser;
   generating, by the computing system, executable rules for the policy model, wherein the executable rules are generated by capturing at least one of rules, requirements, or strictures in the one or more policy documents;
   determining, by the computing system, coverage of the executable rules by mapping the executable rules to a schema of an input database;
   providing, by the computing system, the determined coverage of the executable rules for user approval; and
   determining, by the computing system, an effect of a change to one of the value of one of the one or more parameters, wherein
      the effect is with respect to at least one of the one or more scenarios.

2. The method of claim 1, further comprising: displaying the effect in a user interface.

3. The method of claim 1, further comprising:
   making a change to the policy model; and
   determining another effect, wherein
      the another effect is a result of the change made to the policy model, and
      the another effect is on at least one other of the one or more scenarios.

4. The method of claim 3, further comprising:
   displaying the effect in a user interface; and
   displaying the another effect in a user interface, wherein
      the effect and the another effect are displayed such that the effect and the another effect can be compared.

5. The method of claim 1, further comprising:
   analyzing an outcome, wherein
      the outcome is an outcome of one of the one or more scenarios, and
      the outcome is based on a result of the determining.

6. A computer system comprising:
   a processor;
   a computer-readable storage medium coupled to the processor; and
   a plurality of instructions, encoded in the computer-readable storage medium and configured to cause the processor to
      create a policy model, wherein
         the policy model is configured to represent one or more policy scenarios and includes one or more parameters,
         each of the one or more scenarios is defined, at least in part, by each of the one or more parameters comprising a value or a plurality of values, and
         the policy model is created from one or more policy documents in a natural language format by performing natural language processing using at least a syntactic parser;
      generate executable rules for the policy model, wherein the executable rules are generated by capturing at least one of rules, requirements, or strictures in the one or more policy documents;
      determine coverage of the executable rules by mapping the executable rules to a schema of an input database;
      provide the determined coverage of the executable rules for user approval; and
      determine an effect of a change to one of the value of one of the one or more parameters, wherein
         the effect is with respect to at least one of the one or more scenarios.

7. The computer system of claim 6, wherein the plurality of instructions is further configured to cause the processor to:
   display the effect in a user interface.

8. The computer system of claim 6, wherein the plurality of instructions is further configured to cause the processor to:
   make a change to the policy model; and
   determine another effect, wherein the another effect is a result of the change made to the policy model, and
the another effect is on at least one other of the one or more scenarios.

9. The computer system of claim 8, wherein the plurality of instructions is further configured to cause the processor to:
display the effect in a user interface; and
display the another effect in a user interface, wherein
the effect and the another effect are displayed such that the effect and the another effect can be compared.

10. The computer system of claim 6, wherein the plurality of instructions is further configured to cause the processor to:
analyze an outcome, wherein
the outcome is an outcome of one of the one or more scenarios, and the outcome is based on a result of the determining.

11. A non-transitory computer readable storage medium comprising instructions, executable on a processor of a computing system, that cause the computing system to:
create a policy model, wherein
the policy model is configured to represent one or more policy scenarios and includes one or more parameters,
each of the one or more scenarios is defined, at least in part, by each of the one or more parameters comprising a value or a plurality of values, and
the policy model is created from one or more policy documents in a natural language format by performing natural language processing using at least a syntactic parser;
generate executable rules for the policy model, wherein
the executable rules are generated by capturing at least one of rules, requirements, or strictures in the one or more policy documents;
determine coverage of the executable rules by mapping the executable rules to a schema of an input database;
provide the determined coverage of the executable rules for user approval; and
determine an effect of a change to one of the value of one of the one or more parameters, wherein
the effect is with respect to at least one of the one or more scenarios.

12. The non-transitory computer readable storage medium of claim 11, wherein the instructions further cause the computing system to:
display the effect in a user interface.

13. The non-transitory computer readable storage medium of claim 11, wherein the instructions further cause the computing system to:
make a change to the policy model; and
determine another effect, wherein
the another effect is a result of the change made to the policy model, and
the another effect is on at least one other of the one or more scenarios.

14. The non-transitory computer readable storage medium of claim 13, wherein the instructions further cause the computing system to:
display the effect in a user interface; and
display the another effect in a user interface, wherein
the effect and the another effect are displayed such that the effect and the another effect can be compared.

15. The non-transitory computer readable storage medium of claim 11, wherein the instructions further cause the computing system to:
analyze an outcome, wherein
the outcome is an outcome of one of the one or more scenarios, and
the outcome is based on a result of the determining.

* * * * *

UNITED STATES PATENT AND TRADEMARK OFFICE
CERTIFICATE OF CORRECTION

PATENT NO. : 10,614,421 B2  
APPLICATION NO. : 14/492751  
DATED : April 7, 2020  
INVENTOR(S) : Fifield et al.

Page 1 of 1

It is certified that error appears in the above-identified patent and that said Letters Patent is hereby corrected as shown below:

On the Title Page

Item (57), under Abstract, Line 4, delete "of one of one" and insert -- of one --, therefor.

In the Specification

In Column 1, Lines 34-35, delete "of one of one" and insert -- of one --, therefor.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*